United States Patent
Zheng et al.

(10) Patent No.: US 9,862,798 B2
(45) Date of Patent: Jan. 9, 2018

(54) EPOXY LIQUID CURING AGENT COMPOSITIONS

(71) Applicant: EVONIK DEGUSSA GMBH, Essen (DE)

(72) Inventors: Shiying Zheng, Center Valley, PA (US); Pritesh G. Patel, Breinigsville, PA (US); Gamini Ananda Vedage, Bethlehem, PA (US); Edze Jan Tijsma, Zeist (NL); Gauri Sankar Lal, Whitehall, PA (US)

(73) Assignee: Evonik Degussa GmbH, Essen (DE)

( * ) Notice: Subject to any disclaimer, the term of this patent is extended or adjusted under 35 U.S.C. 154(b) by 218 days.

(21) Appl. No.: 14/041,927

(22) Filed: Sep. 30, 2013

(65) Prior Publication Data

US 2015/0094400 A1 Apr. 2, 2015

(51) Int. Cl.
*C08G 59/60* (2006.01)
*C08L 63/00* (2006.01)
*C08G 59/46* (2006.01)
*C08G 59/56* (2006.01)

(52) U.S. Cl.
CPC .............. *C08G 59/60* (2013.01); *C08G 59/46* (2013.01); *C08G 59/56* (2013.01); *C08L 63/00* (2013.01)

(58) Field of Classification Search
CPC ........ C08G 59/46; C08G 59/56; C08G 59/60; C08L 63/00

USPC ......................................................... 524/495
See application file for complete search history.

(56) References Cited

U.S. PATENT DOCUMENTS

| | | |
|---|---|---|
| 3,391,113 A | 7/1968 | Lopez et al. |
| 3,420,794 A | 1/1969 | May et al. |
| 4,621,128 A | 11/1986 | von Seyerl |
| 4,859,761 A | 8/1989 | Flury et al. |
| 5,214,098 A | 5/1993 | Setiabudi et al. |
| 5,280,091 A | 1/1994 | Dubowik et al. |
| 8,147,964 B2 | 4/2012 | Vedage et al. |
| 8,512,594 B2 | 8/2013 | Walker et al. |
| 8,513,376 B2 | 8/2013 | Raymond et al. |
| 2005/0137357 A1 | 6/2005 | Skoglund et al. |

FOREIGN PATENT DOCUMENTS

| | | | |
|---|---|---|---|
| CN | 102040805 | * 4/2011 | ............. C08G 59/50 |
| CN | 102040805 | 5/2011 | |
| EP | 0659833 A1 | 6/1995 | |
| EP | 2180012 A1 | 4/2010 | |
| JP | 2006143759 A | 6/2006 | |

* cited by examiner

*Primary Examiner* — Ling Choi
*Assistant Examiner* — Chun-Cheng Wang
(74) *Attorney, Agent, or Firm* — Andrew H. Chung; Linda S. Li; Jason S. Ngui

(57) ABSTRACT

The present disclosure provides a liquid curing agent composition comprising at least 50% by weight of a polyamine and 0.2% to 10% by weight of dicyandiamide, the amine/epoxy composition and the product from the cured amine/epoxy composition.

20 Claims, 5 Drawing Sheets

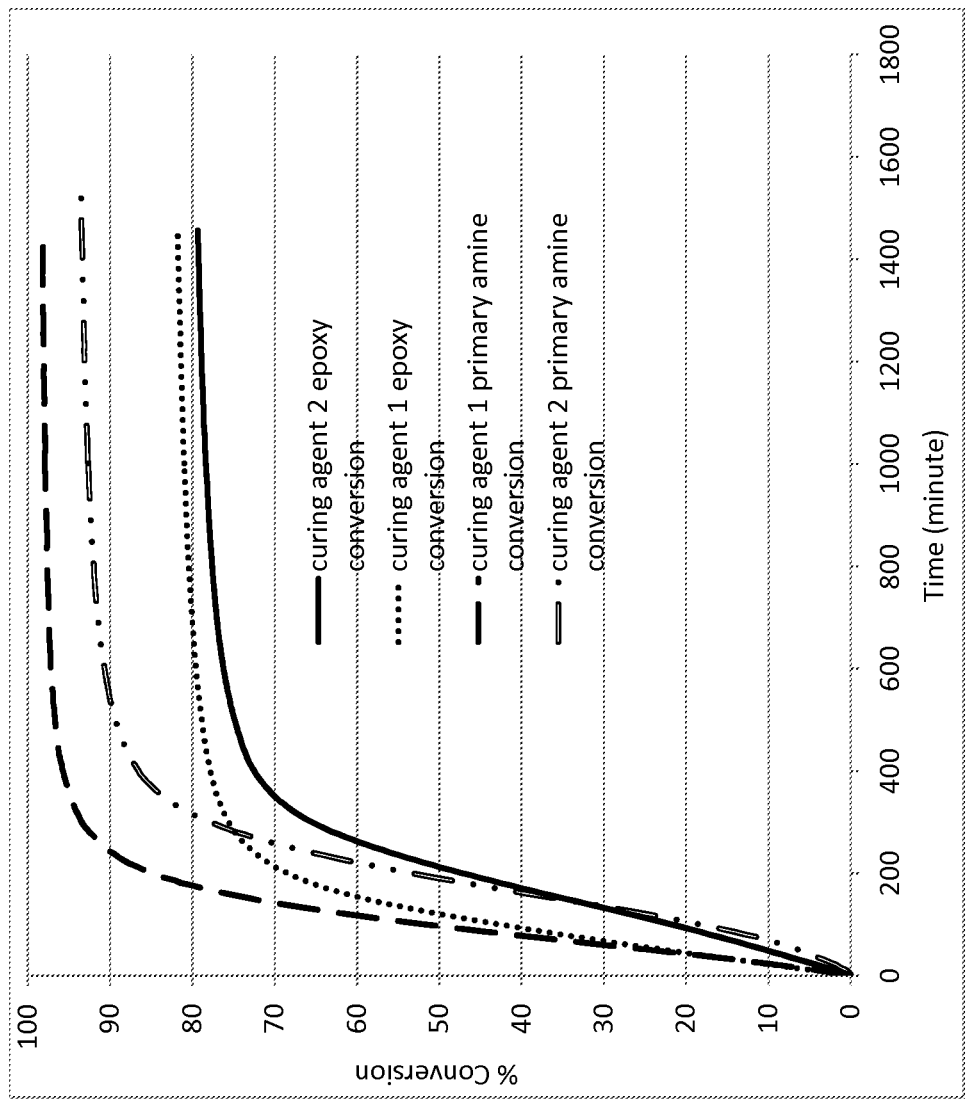
Figure 1. Epoxy and primary amine conversion of Example 1.

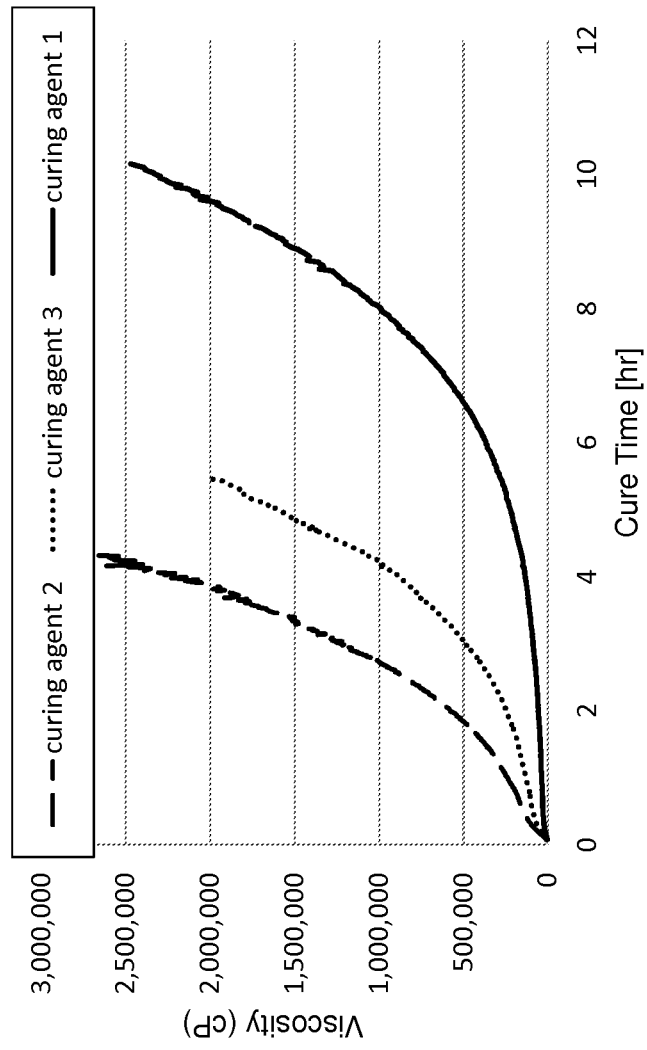
Figure 2. Viscosity profile of amine-epoxy composition of Example 6.

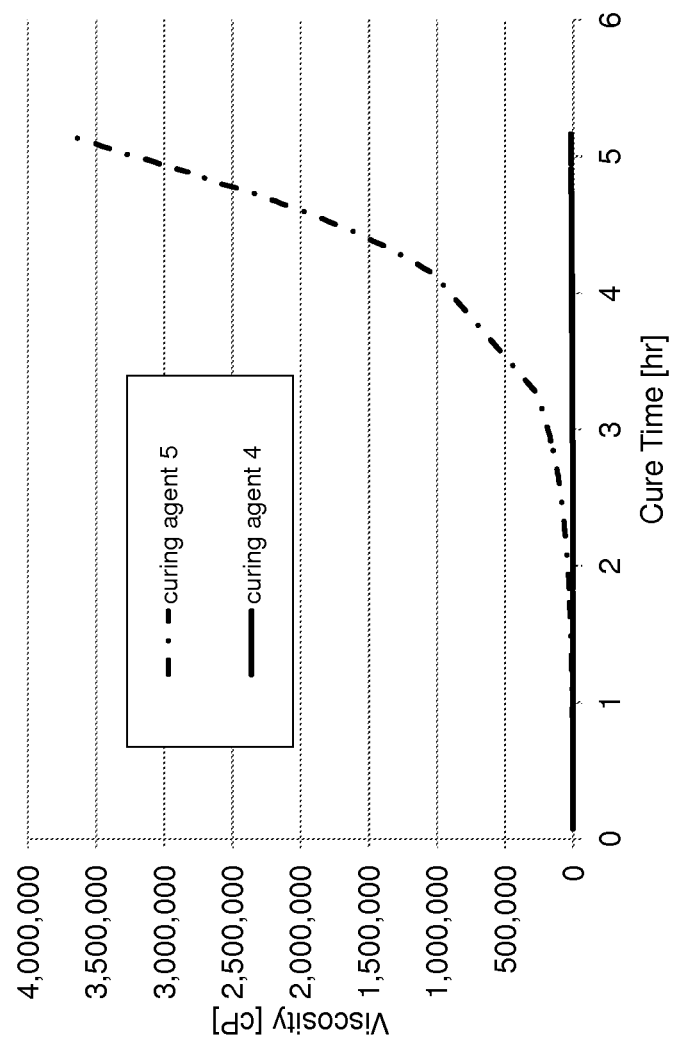
Figure 3. Viscosity profile of amine-epoxy composition of Example 6.

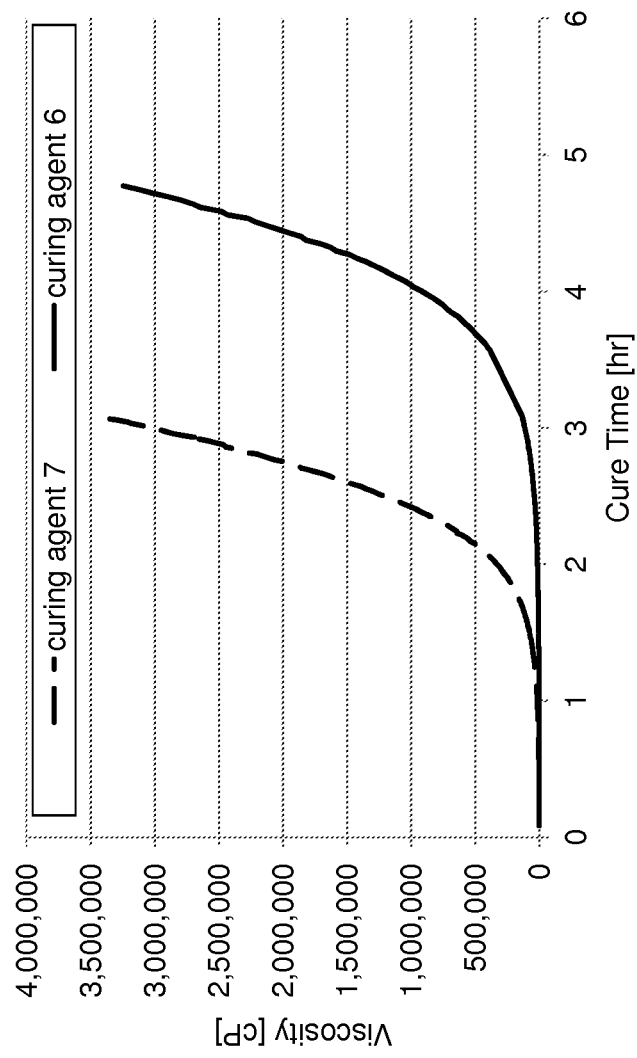
Figure 4. Viscosity profile of amine-epoxy composition of Example 6.

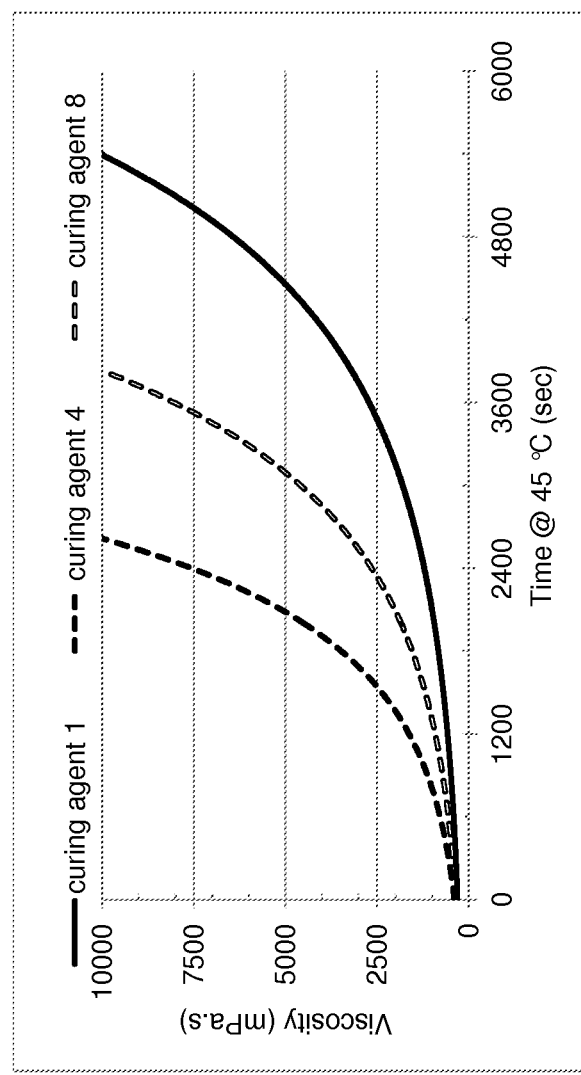
Figure 5. Viscosity profile of curing agents of Example 8.

EPOXY LIQUID CURING AGENT COMPOSITIONS

BACKGROUND OF THE INVENTION

The present disclosure relates to a curing agent composition for an epoxy resin, more particularly, to a liquid curing agent composition comprising a polyamine and an accelerator dicyandiamide, the amine-epoxy resin composition, and the cured products from amine-epoxy composition.

Epoxies are known for their excellent adhesion, chemical and heat resistance, good-to-excellent mechanical properties and very good electrical insulating properties. Cured epoxy resins have found extensive applications in coatings, adhesives, and composite materials such as those using carbon fiber and fiberglass reinforcements. The chemistry of epoxies and the range of commercially available variations offer a broad range of properties tailored for various specific applications. Some specific examples of the applications are listed below. For examples, cured epoxy resins are used as laminating resin for airframe and missile applications, for filament-wound structures, for resin transfer molding, and for tooling fixtures; as casting resin for molds, dies and tooling; as potting and encapsulation compounds, as impregnation resins, as adhesives for aircraft honeycomb structures, as body solders and caulking compounds for repair of plastic and metal parts, and as caulking and sealant compounds in building and highway construction and in applications where high chemical resistance is required. Epoxy-based coatings are used as maintenance and product finishes, marine finishes, masonry finishes, structural steel coatings, tank coatings, aircraft finishes, appliance primers, automotive primers, can and drum linings, furniture finishes, and as varnishes for electric and electronic equipment. They are also used for concrete-floor paints, gym and floor varnishes.

Composite materials are materials made from two or more constituent materials, i.e. matrix and reinforcement, with significantly different physical or chemical properties, that when combined, produce a material with characteristics different from the individual components. The matrix material surrounds and supports the reinforcement materials by maintaining their relative positions. The reinforcements impart their special mechanical and physical properties to enhance the matrix properties. A synergism produces material properties unavailable from the individual constituent materials, while the wide variety of matrix and strengthening materials allows the designer of the product or structure to choose an optimum combination. The reinforcement materials are often fibers such as glass fibers, carbon fibers, or high strength polymers for example, Kevlar® fibers. For polymer composites, the matrix is polymer-based. The most common polymers used in polymer composites are epoxy, phenolic, polyester, polyimide, and others.

Polymer composites offer several advantages compared to metals and ceramics in that polymer composites are lightweight, have high specific stiffness and strength; are easy to manufacture, allow tailoring of the properties by varying the resin's chemistry, reinforcement fibers, and design flexibility for different applications and also have low coefficients of thermal expansion.

Polymer composites, in particular thermosetting polymer material such as epoxy resin, prepared through crosslinking reaction with an appropriate curing agent, based on amine or polyamine(s), have the following desired properties: (a) low to high curing temperature, where the curing reaction can be carried out at a wide range of temperatures from 5° C. to 150° C.; (b) low volume shrinkage rate, where the volume shrinkage rate of cured epoxy resin is typically 1 to 3% resulting in low internal stress in fiber matrix composites; (c) good wetting, adhesion to provide good shear strength between fiber and matrix; (d) good insulating properties; (e) good chemical resistance; and (f) good thermal properties. There are many types of composite applications such as prepregs, laminates, filament windings, braiding, pultrusion, wet lay-up and infusion composites. Resin infusion, or resin transfer, is a process by which resin is introduced to the composite mold, the reinforcement material having already been placed into the mold and closed prior to resin introduction. Conventional processing and chemistry cannot meet current throughput requirements. It is necessary to use additives to improve the cycle time without sacrificing processing and cured product properties.

Epoxy resin compositions often consist of a conventional epoxy resin or epoxy resin mixture, a curing agent and possibly a curing accelerator, and optionally a solvent or a solvent mixture to adjust the viscosity or solubility.

Dicyandiamide has long been known as a latent curative for epoxy resins. (H. Lee and K. Neville "Epoxy Resins" McGraw Hill, New York, 1967, pages 10-16). Because dicyandiamide is not very soluble in either epoxy resin or curing agent, dicyandiamide in general is dispersed in an epoxy resin to provide a one component epoxy with a shelf life of at least 6 months. U.S. Pat. No. 3,391,113 discloses the uses of dicyandiamide as a curing agent for epoxy resin and tetraalkylguanidines as an accelerator for dicyandiamide. EP 659833 discloses an epoxy resin composition comprising an epoxy resin and a curing agent consisting of dicyandiamide, a cycloaliphatic polyamine, a polyoxyalkylene amine and a cure accelerator of tertiary amines, quaternary ammonium compounds, or alkali metal alkoxides. U.S. Pat. No. 5,214,098 discloses the uses of dicyandiamide as a latent curing agent for an epoxy resin composition which cures at temperature of at least 80° C. The composition also includes an amine and a thiol and a cure accelerator of imidazole or substituted imidazoles. US2005/0137357 A1 discloses a curing agent composition comprising a polyamine, a polyamide, dicyandiamide and an imidazole for an epoxy adhesive composition. Dicyandiamide is dispersed in the epoxy resin.

In the art epoxy curing agent listed above, dicyandiamide is in general dispersed in epoxy resin, used as a latent curing agent in conjunction with an accelerator such as an imidazole derivative. Since dicyandiamide cured epoxy systems process high impact strength and abrasion resistance, excellent adhesion to substrates, and good stability towards water and chemicals, effort has also been directed to prepare a homogeneous curing agent solution to incorporate dicyandiamide to maximize its advantage.

U.S. Pat. No. 4,859,761 discloses the preparation and use of soluble substituted cyanoguanidines as curing agents for epoxy resins. Curing of the epoxy resin-substituted cyanoguanidine system is carried out at temperatures of 100-300° C. with an imidazole accelerator.

U.S. Pat. No. 4,621,128 discloses a combination dimethylformamide and a low boiling ketone such as acetone or methyl ethyl ketone, and/or alcohol to solubilize dicyandiamide to prepare a homogenous curing agent that cures epoxy above room temperature.

U.S. Pat. No. 3,420,794 discloses a process for curing an epoxy resin using a curing agent comprising dicyandiamide dissolved in an amine such as diethylenetriamine or N-aminoethylpiperazine.

EP2180012A1 discloses a curing agent solution for epoxy resin composition. The disclosed curing agent solution comprises dicyandiamide dissolved in an amine such as isophorone diamine or Jeffamine D230.

The disclosure of the foregoing publications including patents and patent applications is hereby incorporated by reference.

Due to the wide range of applications of epoxy in coating, adhesive, and composite field, the material requirements for each application varies. For epoxy composite, good adhesion and wettability to the reinforcement fibers are highly desirable to maximize the synergy between epoxy matrix and fibers. A homogeneous liquid curing agent that is compatible with epoxy resin is critical to obtain a homogeneous distribution of epoxy resin on the fibers. Many epoxy composites are processed by heating in order to cure the epoxy resin. Lowering the heat cure temperature, while achieving the same or higher degree of cure will reduce energy consumption, reduce processing time, and increase throughput.

Many composite applications require a high degree of resistance to heat and chemicals and high glass transition temperature (Tg). High Tg requires extensive crosslinking which usually tends to adversely cause embrittlement. It is desirable to produce a cured epoxy having a high Tg and improved chemical resistance while maintaining the mechanical properties.

For coating applications, good adhesion to substrate, improved cure speed, and fast hardness development is essential to ensure short overcoat time if used as primer or middle coat, and fast return to service. A curing agent that can deliver these properties to an epoxy system is highly desirable. In addition, epoxy coatings tend to yellow over time when exposed to light. The common accelerators used in the curing agent such as salicylic acid, or 2,4,6-tri (dimethyaminomethyl)phenol (available as Ancamine® K54 from Air Products & Chemicals, Inc.) can accelerate the yellowing process. A yellowing resistant curing agent composition is also highly desirable for coating applications. When used in adhesive application, good adhesion to substrates and strong bond strength is required.

In all applications, the decrease in the usage level of curing agent while achieving similar or better properties is highly desirable to reduce raw material cost thus reduce cost of the goods manufactured. This would require a better and faster curing agent compared to similar current products. Faster curing will also make it possible to apply coatings or adhesives at temperature below ambient and widen the application window in colder climate.

The need and improvements desired in the art of epoxy curing agents include homogeneous solution, fast cure speed, lower cure temperature, reduced usage level, yellowing resistance, improved chemical resistance, maintaining thermal and mechanical properties, and improved adhesion. These needs and improvements are addressed by the embodiments of the present disclosure as described below and defined by the claims that follow.

BRIEF SUMMARY OF THE INVENTION

The present disclosure includes a liquid curing agent composition comprising at least about 50% by weight of at least one polyamine and about 0.2% to about 10% by weight of dicyandiamide.

Another aspect of the present disclosure includes a liquid curing agent composition comprising at least about 50% by weight of at least one amidoamine or at least one polyamide, and about 0.2% to about 10% by weight of dicyandiamide.

Another aspect of the present disclosure includes a liquid curing agent composition comprising at least one polyamine, and 0.2% to 10% by weight of dicyandiamide, wherein the polyamine comprises a mixture of at least one major polyamine and at least one minor polyamine, and the major polyamine is at least about 70% by weight of the total polyamine, and the minor polyamine is less than about 30% by weight of the total polyamine.

Another aspect of the present disclosure includes an amine-epoxy composition comprising the reaction product of 1) a liquid curing agent composition; and 2) an epoxy component comprising at least one multi-functional epoxy resin. The liquid curing agent composition comprising at least about 50% by weight of at least one polyamine, and about 0.2% to about 10% by weight of dicyandiamide. In the amine-epoxy composition, the ratio of the number of the equivalent of the reactive amine hydrogen in the liquid curing agent composition to the number of the equivalent of epoxide present in the epoxy component is about 0.7 to about 1.3.

Another aspect of the present disclosure includes an amine-epoxy composition comprising the reaction product of 1) a liquid curing agent composition; and 2) an epoxy component comprising at least one multi-functional epoxy resin. The liquid curing agent composition includes at least about 50% by weight of at least one amidoamine or at least one polyamide, and about 0.2% to about 10% by weight of dicyandiamide. In the amine-epoxy composition, the ratio of the number of the equivalent of the reactive amine hydrogen in the liquid curing agent composition to the number of the equivalent of epoxide present in the epoxy component is 0.7 to 1.3.

Another aspect of the present disclosure includes an amine-epoxy composition comprising the reaction product of 1) a liquid curing agent composition comprising at least about 50% by weight of a polyamine, and about 0.2% to about 10% by weight of dicyandiamide, and 2) an epoxy component comprising at least one multi-functional epoxy resin. The polyamine of the liquid curing agent composition comprises a mixture of at least one major polyamine and at least one minor polyamine, and the major polyamine is at least about 70% by weight of the total polyamine, and the minor polyamine is less than about 30% by weight of the total polyamine. In the amine-epoxy composition, the ratio of the number of the equivalent of the reactive amine hydrogen in the liquid curing agent composition to the number of the equivalent of epoxide present in the epoxy component is about 0.7 to about 1.3.

A further aspect of the invention comprises any of the foregoing aspects and further comprising at least one reinforcing fiber and wherein the reinforcing fiber comprises at least one member selected from the group consisting of woven or non-crimp fabrics, nonwoven webs or mats, fiber stands, staple fiber formed of continuous or discontinuous fiber and combinations thereof.

Another aspect of the invention relates to a method for producing an yellowing resistant amine-epoxy composition comprising the steps of Mixing the liquid curing agent composition comprising at least about 50% by weight of a polyamine and about 0.2% to about 10% by weight of dicyandiamide and an epoxy component comprising at least one multi-functional epoxy resin Cure the amine/epoxy composition at a temperature from about 0° C. to about 150° C.

Other features and advantages of the present disclosure will be apparent from the following more detailed description of various embodiments, which illustrates, by way of example, the principles of the disclosure. The various embodiments can be used alone or in combinations with each other.

BRIEF DESCRIPTION OF SEVERAL VIEWS OF THE DRAWINGS

FIG. 1 illustrates an epoxy and primary amine conversion of amine-epoxy composition using curing agents 1 and 2 at 25° C. in Example 1.

FIG. 2 illustrates a viscosity profile of amine-epoxy composition using curing agents 1, 2, and 3 at 5° C. in Example 6.

FIG. 3 illustrates a viscosity profile of amine-epoxy composition using curing agents 4 and 5 at 25° C. in Example 6.

FIG. 4 illustrates a viscosity profile of amine-epoxy composition using curing agents 6 and 7 at 25° C. in Example 6.

FIG. 5 illustrates a viscosity profile of curing agents 1, 4, and 8 at 45° C. in Example 8.

DETAILED DESCRIPTION OF THE INVENTION

The present disclosure includes a liquid curing agent composition comprising at least about 50% by weight of at least one polyamine, and about 0.2% to about 10% by weight of dicyandiamide. The present disclosure also includes an amine-epoxy composition comprising the reaction product of 1) a liquid curing agent composition; and 2) an epoxy component comprising at least one multi-functional epoxy resin. In the amine-epoxy composition, the ratio of the number of the equivalent of the reactive amine hydrogen in the liquid curing agent composition to the number of the equivalent of epoxide present in the epoxy component is about 0.7 to about 1.3, about 0.7 to about 1.1, about 0.7 to about 1.0, about 0.8 to about 1.3, about 0.8 to about 1.1, about 0.8 to about 1.0, and in some cases about 0.9 to about 1.3.

The liquid curing agent of the present disclosure comprising at least about 50% by weight of at least one polyamine, and about 0.2% to about 10% by weight of dicyandiamide is homogenous and stable, offers good compatibility with epoxy resin and provides fast cure. In addition, the use of the liquid curing agent with the epoxy resins maintains or improves the thermal and mechanical properties of the cured resins, and the cured resins are more yellowing resistant than those cured by other cure accelerators when exposed to light.

The following definitions and abbreviations are provided in order to aid those skilled in the art in understanding the detailed description of the present disclosure.

The term "polyamines", as utilized herein, also referred to a multifunctional amine, describes compounds with amine functionality and contains at least two (2) active amine hydrogens.

The term "liquid curing agent composition", as utilized herein, describes the curing agent composition that is an optically clear fluid, as determined visually, at the temperature 5° C. to 20 C and having a viscosity of about 50 centipoise to about 50,000 centipoise.

Amine/epoxy ratio or stochiometry refers to the ratio of the number of equivalent of active amine hydrogen in the curing agent composition to the number of equivalent of epoxide group in the epoxy component in an amine-epoxy composition.

DSC—differential scanning calorimetry
AHEW—amine hydrogen equivalent weight
Jeffamine® D230—poly(propylene oxide)diamine from Huntsman Corp
DETA—diethylenetriamine, AHEW=21
DGEBA—diglycidyl ether of bisphenol-A, EEW 182-192
DERTM 331—Liquid DGEBA
EDA—ethylenediamine
EEW—epoxy equivalent weight
EPON® 828—liquid epoxy resin with EEW approximately 184-192
Amicure® PACM—4,4'-di(aminocyclohexyl)methane, supplied by Air Products & Chemicals, Inc.
Ancamine® K54—2,4-6-tris(N,N-dimethylaminomethyl)phenol, supplied by Air Products & Chemicals, Inc.
Ancarez RZ4010—liquid DGEBA, EEW 187, supplied by Biesterfeld Spezialchemie GmbH, Germany
IPDA—isophoronediamine, AHEW=43
mXDA—metaxylylene diamine manufactured by Mitsubishi Gas Chemical Co. N3-N-3-aminopropyl ethylenediamine
N4—N,N'-bis(3-aminopropyl)ethylenediamine
N5—N,N,N'-tris(3-aminopropyl)ethylenediamine
N3-N5—mixture of N3, N4 and N5
PEHA—pentaethylenehexamine
PHR—parts per hundred weight resin
TEPA—tetraethylenepentamine
TETA—triethylenetetramine, AHEW=25
TOFA—tall oil fatty acid Embodiments of the present disclosure include liquid curing agent compositions and the use of such compositions. These liquid curing agent compositions can be used to cure, harden, crosslink, and/or react with epoxy resins. Embodiments of the present disclosure include liquid curing agent compositions comprising at least about 50%, or at least about 60%, or at least about 70% by weight of at least one polyamine, and about 0.2% to about 10% by weight of dicyandiamide, or about 0.2% to about 8%, or about 0.2% to about 6%, or about 0.2% to about 5%, or about 0.2 to about 4% by weight of dicyandiamide.

Other embodiments include liquid curing agent composition comprising at least about 50% by weight of at least one polyamine, and about 0.2% to about 10% by weight of dicyandiamide, wherein the polyamine comprises the mixture of at least one major polyamine and at least one minor polyamine, wherein the major polyamine is at least about 70% by weight of the total polyamine, and the minor polyamine is less than about 30% by weight of the total polyamine, or at least about 80% by weight of the major polyamine and less than about 20% by weight of the minor polyamine, or at least about 90% by weight of the major polyamine and less than about 10% by weight of the minor polyamine.

The solubility of dicyandiamide is relatively poor in most amines, and it tends to recrystallize out over time. Relative good solubility is measured by at least 5 grams of dicyandiamide dissolved in 100 grams of a polyamine at a temperature of 5 to 20° C. to form an optically clear fluid, as determined visually. When a polyamine comprising a major and minor amine is employed, the major polyamine in the liquid curing agent composition of the present disclosure serves as the main curing agent, and the minor polyamine provides good solubilizing environment for dicyandiamide without adversely affecting the property of the curing agent and the amine-epoxy cured composition. That is, the solubility of dicyandiamide is greater in the minor polyamine than in the major polyamine. The minor polyamine improves the solubility of dicyandiamide in curing agent and provides good stability and shelf life for the liquid curing agent composition of the present disclosure. If desired, the dicyandiamide can be combined with or dissolved by the minor polyamine and then combined with the remaining ingredients.

The polyamines or multifunctional amines that are within the scope of the present disclosure include, but are not limited to, at least one member selected from the group consisting of aliphatic, cycloaliphatic, aromatic, heterocyclic, arylaliphatic, and polyether amines, amidoamines, and polyamides. The polyamines also include a Mannich base derivative of an aliphatic amine, a cycloaliphatic amine, an aromatic amine, a polyamide or an amidoamine; and an amine-epoxy adduct derivative of an aliphatic amine, a cycloaliphatic amine, an aromatic amine, a polyamide, or an amidoamine with a monoglycidyl ether of glycols or phenols, glycidyl ether of bisphenol A or bisphenol F or an epoxy novolac resin, and the like, and any combination thereof.

Exemplary aliphatic polyamines include at least one member from the group consisting of polyethyleneamines (EDA, DETA, TETA, TEPA, PEHA, and the like), dipropylenetriamine, polypropyleneamines (dipropylenetriamine), N-3-aminopropyl ethylenediamine (N3), aminopropylated ethylenediamines (Am3, Am4, Am5, and the like), aminopropylated propylenediamines, 1,6-hexanediamine (HMDA), 3,3,5-trimethyl-1,6-hexanediamine, tripropylenetetramine, N-3-aminopropyl-1,3-diaminopropane, N,N'-bis(3-aminopropyl)-1,3-diaminopropane, N,N,N'-tris(3-aminopropyl)-1,3-diaminopropane, 2-methyl-1,5-pentanediamine, N,N'-bis(3-aminopropyl)ethylenediamine (N4), N,N,N'-tris(3-aminopropyl)ethylenediamine (N5), and any combination thereof.

Particularly suitable aliphatic polyamines include at least one of DETA, TETA, TEPA, N3, N4, N5,3,3,5-trimethyl-1,6-hexanediamine and any combination thereof.

The polyether amines include at least one member selected from the group consisting of poly(alkylene oxide) monoamines, diamines and triamines. Exemplary polyether amines include poly(ethylene oxide), poly(propylene oxide) and poly(tetramethylene oxide) monoamines, diamines and triamine. Poly(propylene oxide) monoamines, diamines and triamines useful in the present disclosure are commercially available under the Jeffamine® trademark. Illustrative examples include, but are not limited to, at least one of poly(ethylene glycol-block-propylene glycol) (2-amino-2-methyl)methyl ether (available as Jeffamine® M-600, Jeffamine® M-1000, Jeffamine® M-2005, and Jeffamine® M-2070), poly(ethylene glycol-block-propylene glycol)bis(2-amino-2-methyl)ether (available as Jeffamine® ED600, ED900, and ED 2001), tri(2-amiono-2-methylethyl)trimethylolpropane ether (available as Jeffamine® T-403), tri(2-amiono-poly(propylene oxide))glycerine ether (available as Jeffamine® T-5000), bis(3-aminopropyl)polypropylene glycol ether (Jeffamine® D230, D400, D2000, and D4000) and any combination thereof. Poly(ethylene oxide) monoamines, diamines and triamines include, but are not limited to, at least one of triethylene glycol diamine (available as Jeffamine® XTJ 504), bis(3-aminopropyl)diethylene glycol ether (available as Ancamine® 1922A), di(2-aminopropylated) diethylene glycol (also referred to as bis(2-amino-2-methylethyl) diethylene glycol ether, available as Jeffamine® XTJ-511), poly(ethylene oxide) methyl (3-aminopropyl) ether, poly(ethylene glycol)diamine (available as Jeffamine® XTJ-512), poly(ethylene oxide)bis(3-amino-propyl) ether and any combination thereof. Poly(tetramethylene oxide) monoamines, diamines and triamine include but are not limited to at least one of bis(3-aminopropyl)polytetrahydrofuran (Mn 350), bis(3-aminopropyl)polytetrahydrofuran (Mn 750), poly(propylene oxide-block-tetramethylene oxide)bis(2-amino-2-methylethyl)ether (available as Jeffamine® XTJ-533, and XTJ-536) and any combination thereof.

Particularly suitable polyether amines include at least one of triethylene glycol diamine (available as Jeffamine® XTJ 504), poly(ethylene glycol-block-propylene glycol)bis(2-amino-2-methyl)ether (available as Jeffamine® ED600, ED900, and ED 2001), tri(2-amiono-2-methylethyl)trimethylolpropane ether (available as Jeffamine® T-403), bis(3-aminopropyl)polypropylene glycol ether (Jeffamine® D230, D400, D2000, and D4000, bis(3-aminopropyl)diethylene glycol ether (available as Ancamine® 1922A), bis(2-amino-2-methylethyl) diethylene glycol ether (available as Jeffamine® XTJ-511), poly(ethylene oxide) methyl (3-aminopropyl)ether, poly(ethylene glycol)diamine (available as Jeffamine® XTJ-512). poly(ethylene oxide)bis(3-aminopropyl)ether, and bis(3-aminopropyl)polytetrahydrofuran and any combination thereof.

Cycloaliphatic amines include, but are not limited to, at least one of 1,2-diaminocyclohexane, 1,3-diaminocyclohexane, 1,4-diaminocyclohexane, hydrogenated ortho-toluenediamine, hydrogenated meta-toluenediamine, hydrogenated metaxylylene diamine (referred to as 1,3-bis(aminomethyl)cyclohexane, or 1,3-BAC), isophorone diamine (IPDA), norbornane diamines, 3,3'-dimethyl-4,4"-diaminodicyclohexyl methane, di(aminocyclohexyl)methane (including various isomers such as up to about 5 wt. % 2,4-(diaminocyclohexyl)methane and at least about 95 wt. % 4,4'-(diaminocyclohexyl)methane (available as Amicure PACM from Air Products & Chemicals, Inc.)), 1,3-di(aminocyclohexyl)propane, 1-cyclohexylamino-3-aminopropane, di(aminocyclohexyl)sulfone, a mixture of methylene bridged poly(cyclohexyl-aromatic)amines, and the like, and combinations thereof. Particularly suitable cycloaliphaic polyamines include 4,4'-di(aminocyclohexyl)methane, isophorone diamine (IPDA), norbornane diamines, 1,3-bis(aminomethyl)cyclohexane, 1,2-diaminocyclohexane, and 1-cyclohexylamino-3-aminopropane.

Aromatic polyamines include at least one of m-phenylenediamine, p-phenylenediamine diaminophenylmethane (DDM), tri(aminoethyl)benzene, tri(aminobutyl)naphthalene, toluene diamine (2-methyl-p-phenylene diamine), diethyl toluene diamine, diaminodiphenylsulfone (DDS) and combinations thereof. The mixture of methylene bridged poly(cyclohexyl-aromatic)amines is abbreviated as either MBPCAA or MPCA, and is described in U.S. Pat. No. 5,280,091, which is incorporated herein by reference in its entirety. In one aspect of the present disclosure, the polyamine is a mixture of methylene bridged poly(cyclohexyl-aromatic)amines (MPCA).

Heterocyclic polyamines include at least one of N-aminoethylpiperazine (NAEP), 3,9-bis(3-aminopropyl)2,4,8,10-tetraoxaspiro(5,5)undecane, piperazine, 4,4'-trimethylenedipiperidine, 1,4-bis(3-aminopropyl)piperazine, 2,5-dimethylpiperazine, 2,6-dimethylpiperazine, 2-methylpiperazine, homopiperazine and combinations thereof.

Arylaliphatic polyamine includes examples such as at least one of m-xylylenediamine (mXDA), p-xylylenediamine, di(aminoethyl)benzene, tri(aminoethyl)benzene, tri(aminobutyl)naphthalene and combinations thereof.

Mannich base polyamines derive from the reaction of the above described aliphatic amines, cycloaliphatic amines, polyether amines, or aromatic amines with phenol or a substituted phenol and formaldehyde. An exemplary substituted phenol used to make Mannich bases with utility in the present disclosure is cardanol, which is obtained from cashew nut shell liquid. Alternatively, Mannich bases can be prepared by an exchange reaction of a multifunctional amine with at least one tertiary amine containing a Mannich base, such as 2,4,6-tris(N,N-dimethylaminomethyl)phenol (commercially available as Ancamine® K-54 from Air Products and Chemicals, Inc.) or bis(N,N-dimethylaminomethyl)phenol.

Amine-epoxy adducts can be prepared by the reaction of an aliphatic amine, a cycloaliphatic amine, a heterocyclic amine, a polyether amine, or an aromatic amine with an epoxy resin. This is a common practice well known to those skilled in the art, and generally referred to as "adduction". By adducting with difunctional and monofunctional epoxy resins it is possible to improve the compatibility of the curing agent with epoxy resin and thereby reduce problems such as blush, carbonation and exudation as described above, and to increase pot life. Particularly useful epoxy resins for adduction include at least one of the diglycidyl ethers of bisphenol-A and bisphenol-F, the advanced diglycidyl ethers of bisphenol-A and bisphenol A, styrene oxide, cyclohexene oxide, and the glycidyl ethers of phenol, the cresols, tert-butylphenol and other alkyl phenols, butanol, 2-ethylhexanol, and C8 to C14 alcohols and the like, and combinations thereof.

Amidoamines are derived from a monobasic carboxylic acid and a polyamine such as an aliphatic amine, a cycloaliphatic amine, a heterocylic amine, or an aromatic amine. The monobasic carboxylic acids are usually at least one of the C16, C18, C19 type fatty acids derived from fats and oils, particularly from soya, tall oil, ricinoleic acids and combinations thereof. The polyamines used can comprise at least one of DETA, TETA, TEPA, piperazine, alkylated and benzylated amine described in U.S. Pat. No. 8,147,964 which is hereby incorporated by reference in its entirety. If desired, amidoamines can be modified by reacting a portion of the amine hydrogen with difunctional and monofunctional epoxy resins such as those described above.

Amidoamine curing agents have the advantages over straight polyamines of reduced volatility and skin-irritation potential, more convenient mixing ratios and increased flexibility and impact strength.

During the synthesis of amidoamines, at higher temperature usually leads to the formation imidazoline structure derived from ring closure of an amine group with an amide group. The ratio of the amide and imidazoline depends on the reaction condition. The imidazoline moiety serves the function of improving wetting to surface thus improving adhesion, also increase the chemical and heat resistance of the cured product. Illustrative examples of amidoamines include at least one amidoamine based on the reaction products of C16, C18, C19 type fatty acids particularly tall oil fatty acid (TOFA) and TEPA, available as Ancamide® 500, 501, 506, 502, 503, 2447, or 507 curing agent from Air Products and Chemicals, Inc., and epoxy modified amidoamine such as Ancamide® 2426 curing agent.

In one embodiment of the invention, the curing agent comprises amidoamines and the curing agent is substantially free of aliphatic, cycloaliphatic, aromatic and heterocyclic polyamines. By "substantially free" is it meant that the curing agent contains less than about 15%, or about 10%, or about 5% by weight, and in some cases 0% by weight of the foregoing amines.

Polyamide curing agents are comprised of the reaction products of at least one dimerized fatty acid (dimer acid) and at least one of an aliphatic amine, a cycloaliphatic amine, heterocyclic amine, or aromatic amine and usually a certain amount of monomeric fatty acid which helps to control molecular weight and viscosity. "Dimerized" or "dimer" or "polymerized" fatty acid refers, generally, to polymerized acids obtained from unsaturated fatty acids. Dimer acid is typically prepared by the acid catalyzed oligomerization under pressure of certain monomeric unsaturated fatty acids such as C16, C18, C19 type fatty acids usually tall oil fatty acid (TOFA), though sometimes other vegetable acids such as soya fatty acid or cottonseed fatty acid are substituted. The dimer acids are prepared by polymerizing the fatty acids under pressure, and then removing most of the unreacted fatty mono-acids by distillation. The final product comprises mostly dimeric acids, but includes trimeric as well as some higher acids. The ratio of dimeric acids to trimeric and higher acids is variable, depending on processing conditions and the unsaturated acid feedstock. The dimer acid may also be further processed by, for example, hydrogenation, which reduces the degree of unsaturation and the color of the product. Commercial products generally consist of mostly (>70%) dimeric species, with the rest consisting mostly of trimers and higher oligomers, along with small amounts (generally less than 5%) of monomeric fatty acids. Polyamides can also derive from acid-terminated polyesters, from condensation products of unsaturated fatty acids with dicyclopentadiene, from reaction product of maleic anhydride or acid with an olefinic compound and polyamines, and from castor-oil-DGEBA-styrene oxide adduct and polyamines. Polyamides have shown to improve moisture resistance due to the shielding effect from fatty groups. At room temperature, the viscosity of the commercial polyamides is high therefore they are often used with diluted epoxy resin or at elevated temperature.

In one embodiment of the invention, the inventive curing agent comprises at least one polyamide and the curing agent is substantially free of aliphatic, cycloaliphatic, aromatic and heterocyclic polyamines. By "substantially free" is it meant that the curing agent contains less than about 15%, or about 10%, or about 5% by weight, and in some cases 0% by weight of the foregoing amines.

In addition, other lower molecular weight monofunctional or difunctional carboxylic acids may be used with dimer and monobasic acid in order to provide specialized property enhancements and to reduce AHEW. The AHEW of the inventive curing agent can range from about 20 to about 250, or about 20 to about 200, or about 20 to about 180, or about 25 to about 180, or about 30 to about 150, or about 40 to about 150, or about 50 to about 140, or about 50 to about 120, and in some cases about 50 to about 110.

It is also possible to modify the polyamides of the current disclosure by reacting at least a portion of the amine hydrogen with difunctional and monofunctional epoxy resins such as those described above. It is also possible to use alkylated or benzylated polyamines to prepare polyamides as disclosed in U.S. Pat. No. 8,513,376, which is hereby incorporated by reference in its entirety.

Illustrative examples of polyamides include polyamides derived from the reaction products of TOFA, dimer acid and TEPA (available as Ancamide® 220, 220-x-70, 221, 350A, 351A, 375A, and 260 curing agents from Air Products and Chemicals, Inc.).

Other embodiments of the present disclosure include the use of modified amine components, such as benzylated or alkylated versions of the above amines as described in benzylated amine described in U.S. Pat. No. 8,147,964 and U.S. Pat. No. 8,512,594 which are hereby incorporated by reference in its entirety.

Particularly suitable polyamines include aliphatic polyamines comprising at least one of diethylenetriamine (DETA), triethylenetetramine (TETA), N-3-aminopropyl ethylenediamine (N3), N,N'-bis(3-aminopropyl)ethylenediamine (N4), N,N,N'-tris(3-aminopropyl)ethylenediamine (N5), and 3,3,5-trimethyl-1,6-hexanediamine; cycloaliphatic polyamines of 1,2-diaminocyclohexane, 4,4'-di (aminocyclohexyl)methane, isophorone diamine (IPDA), norbornane diamines, 1,3-bis(aminomethyl)cyclohexane, and 1-cyclohexylamino-3-aminopropane; Arylaliphatic polyamines includes of m-xylylenediamine (mXDA), or p-xylylenediamine, di(aminoethyl)benzene, and tri(aminoethyl)benzene; polyether amines of triethylene glycol diamine (available as Jeffamine® XTJ 504), poly(ethylene glycol-block-propylene glycol)bis(2-amino-2-methyl)ether (available as Jeffamine® ED600, ED900, and ED 2001), tri(2-amino-2-methylethyl)trimethylolpropane ether (available as Jeffamine® T-403), bis(3-aminopropyl)polypropylene glycol ether (Jeffamine® D230, D400, D2000, and D4000, bis(3-aminopropyl)diethylene glycol ether (available as Ancamine® 1922A), bis(2-amino-2-methylethyl) diethylene glycol ether (available as Jeffamine® XTJ-511), poly(ethylene oxide) methyl (3-aminopropyl)ether, and poly(ethylene oxide)bis(3-amino-propyl)ether, and bis(3-aminopropyl)polytetrahydrofuran; heterocyclic polyamines of N-aminoethylpiperazine (NAEP), piperazine, 4,4'-trimethylenedipiperidine, 1,4-bis(3-aminopropyl)piperazine, 2,5-dimethylpiperazine, and 2,6-dimethylpiperazine; arylaliphatic polyamine of m-xylylenediamine (mXDA), p-xylylenediamine, di(aminoethyl)benzene, and tri(aminoethyl)benzene; amidoamines of reaction product of tall oil fatty acid (TOFA) and tetraethylene pentamine (TEPA) (available as Ancamide® 500, 501, 506, 502, 503, 507), and epoxy modified amidoamine (available as Ancamide® 2426), and polyamides of the reaction product of dimer acid, and TOFA with TEPA (available as Ancamide® 220, 220-x-70, 221, 350A, 351A, 375A, and 260); amine-epoxy adducts prepared by the reaction of an aliphatic amine, cycloaliphatic amine, heterocyclic, polyether amine, or aromatic amine with an epoxy resin, and combinations thereof. Particularly useful epoxy resins for adduction include at least one of the diglycidyl ethers of bisphenol-A and bisphenol-F, the advanced diglycidyl ethers of bisphenol-A and bisphenol A, styrene oxide, cyclohexene oxide and the glycidyl ethers of phenol, the cresols, tert-butylphenol and other alkyl phenols, butanol, 2-ethylhexanol, C8 to C14 alcohols and the like, and combinations thereof.

In one embodiment, the liquid curing agent composition of the present disclosure comprises at least about 50% by weight of a polyamine and about 0.2% to about 10% by weight of dicyandiamide. The polyamine is selected from at least one of aliphatic polyamines, cycloaliphatic polyamines, heterocyclic polyamines, polyetheramine, aromatic polymers, amidoamines, amine-epoxy adducts prepared by the reaction of an aliphatic amine, cycloaliphatic amine, heterocyclic, polyether amine, aromatic amine with an epoxy resin, and combinations thereof.

The polyamine can comprise at least one member selected from aliphatic polyamines of diethylenetriamine (DETA), triethylenetetramine (TETA), N-3-aminopropyl ethylenediamine (N3), N,N'-bis(3-aminopropyl)ethylenediamine (N4), N,N,N'-tris(3-aminopropyl)ethylenediamine (N5), and 3,3,5-trimethyl-1,6-hexanediamine; cycloaliphatic polyamines of 1,2-diaminocyclohexane, 4,4'-di(aminocyclohexyl)methane, isophorone diamine (IPDA), norbornane diamines, 1,3-bis(aminomethyl)cyclohexane, and 1-cyclohexylamino-3-aminopropane; arylaliphatic polyamines includes of m-xylylenediamine (mXDA), p-xylylenediamine, di(aminoethyl)benzene, and tri(aminoethyl)benzene; polyether amines of triethylene glycol diamine (available as Jeffamine® XTJ 504), poly(ethylene glycol-block-propylene glycol)bis(2-amino-2-methyl)ether (available as Jeffamine® ED600, ED900, and ED 2001), tri(2-amino-2-methylethyl)trimethylolpropane ether (available as Jeffamine® T-403), bis(3-aminopropyl)polypropylene glycol ether (Jeffamine® D230, D400, D2000, and D4000, bis(3-aminopropyl)diethylene glycol ether (available as Ancamine® 1922A), bis(2-amino-2-methylethyl) diethylene glycol ether (available as Jeffamine® XTJ-511), poly(ethylene oxide) methyl (3-aminopropyl)ether, and poly(ethylene oxide)bis(3-amino-propyl)ether, and bis(3-aminopropyl)polytetrahydrofuran; heterocyclic polyamines of N-aminoethylpiperazine (NAEP), piperazine, 4,4'-trimethylenedipiperidine, 1,4-bis(3-aminopropyl)piperazine, 2,5-dimethylpiperazine, and 2,6-dimethylpiperazine; amidoamines of reaction product of tall fatty acid TOFA and amidoamines of reaction product of tall oil fatty acid (TOFA) and tetraethylene pentamine (TEPA) (available as Ancamide® 500, 501, 506, 502, 503, 507), polyamide of the reaction product of dimer acid, and TOFA with TEPA (available as Ancamide® 220, 220-x-70, 221, 350A, 351A, 375A, and 260), and amine-epoxy adducts prepared by the reaction of DETA, TETA, 4,4'-di(aminocyclohexyl)methane, IPDA, MXDA, or NAEP, with an epoxy resin of diglycidyl ethers of bisphenol-A and bisphenol-F, the advanced diglycidyl ethers of bisphenol-A and bisphenol F, styrene oxide, cyclohexene oxide and the glycidyl ethers of phenol, the cresols, tert-butylphenol, butanol, or C8 to C14 alcohols and the like.

Additionally, the liquid curing agent composition described herein can be solvent-based. Alternatively, in another aspect of the present invention, these compositions can further comprise at least one diluent, such as, for example, an organic solvent, or an organic or inorganic acid. Appropriate organic solvents are well known to those skilled in the art of amine formulation chemistry. Exemplary organic solvents suitable for use in the present invention include, but are not limited to, benzyl alcohol, butanol, toluene, xylene, methyl ethyl ketone, and the like, or combinations thereof. Non-limiting examples of organic and inorganic acids are acetic acid, sulfamic acid, lactic acid, salicylic acid, sebacic acid, boric acid, phosphoric acid, and the like, or combinations thereof. Such acids can increase the curing speed of the curing agent composition. The amount of solvent or diluent can range from about 5% to about 50%, or about 5% to about 40%, or about 5% to about 35%, or about 5% to about 25%, or about 5% to 20% by weight, and in some cases about 5% to about 15% by weight of the curing agent.

The liquid curing agent compositions also can be further modified with monofunctional epoxides, such as, for example, phenyl glycidyl ether, o-cresyl glycidyl ether, p-tert-butylphenyl glycidyl ether, n-butyl glycidyl ether, and other similar glycidyl ethers or esters. Further, the liquid curing agent compositions disclosed herein can be blended with other commercially available curing agents. Such commercially available curing agents include, but are not limited to, solvent based, solvent free or water-based curing agents, which can be employed in a blend to target specific properties, such as cure rate, drying speed, hardness development, clarity, and gloss. The amount of the foregoing blends can range from about The amount of solvent or diluent can range from about 5% to about 50%, or about 5% to about 40%, or about 5% to about 35%, or about 5% to about 25%, or about 5% to about 20% by weight, and in some cases about 5% to about 15% by weight of the curing agent. In one embodiment, the liquid curing agent composition of the present disclosure comprises at least about 50% by weight of a polyamine and about 0.2% to 10% by weight of dicyandiamide. The liquid curing agent composition is homogeneous and stable, i.e. no recrystallization of dicyandiamide is observed over a period of 3 months at temperature 5° C. and above.

In another embodiment, the liquid curing agent composition of the present disclosure comprises at least about 50% by weight of an aliphatic polyamine and about 0.2% to about 10% by weight of dicyandiamide. The aliphatic polyamine is selected from at least one of diethylenetriamine (DETA), triethylenetetramine (TETA), N-3-aminopropyl ethylenediamine (N3), N,N'-bis(3-aminopropyl)ethylenediamine (N4), or 3,3,5-trimethyl-1,6-hexanediamine.

In another embodiment, the liquid curing agent composition of the present disclosure comprises at least about 50% by weight of a cycloaliphatic polyamine and about 0.2% to about 10% by weight of dicyandiamide. The cycloaliphatic polyamine is selected from at least one of 1,2-diaminocyclohexane, 4,4'-di(aminocyclohexyl)methane, isophorone diamine (IPDA), norbornane diamines, 1,3-bis(aminomethyl)cyclohexane, 1-cyclohexylamino-3-aminopropane and combinations thereof;

In another embodiment, the liquid curing agent composition of the present disclosure comprises at least about 50% by weight of a heteroaliphatic polyamine and about 0.2% to about 10% by weight of dicyandiamide. The heteroaliphatic polyamine is at least one selected from N-aminoethylpiperazine (NAEP), piperazine, 4,4'-trimethylenedipiperidine, 1,4-bis(3-aminopropyl)piperazine, 2,5-dimethylpiperazine, 2,6-dimethylpiperazine; and combinations thereof.

In another embodiment, the liquid curing agent composition of the present disclosure comprises at least about 50% by weight of an arylalphatic polyamine and about 0.2% to about 10% by weight of dicyandiamide. The arylalphatic polyamine is at least one member selected from m-xylylenediamine (mXDA), p-xylylenediamine, di(aminoethyl)benzene, tri(aminoethyl)benzene, and diethyl toluene diamine.

In another embodiment, the liquid curing agent composition of the present disclosure comprises at least about 50% by weight of an amidoamine and about 0.2% to about 10% y weight of dicyandiamide. The amidoamine is the reaction product of C16, C18, C19 type fatty acids and TEPA, particularly the reaction product of tall oil fatty acid (TOFA) and TEPA.

In another embodiment, the liquid curing agent composition of the present disclosure comprises at least about 50% by weight of a polyamide and about 0.2% to about 10% by weight of dicyandiamide. The polyamide is the reaction product of C16, C18, C19 type fatty acids, dimer acid, and TEPA, particularly the reaction product of tall oil fatty acid (TOFA), dimer acid, and TEPA.

In another embodiment, the liquid curing agent composition of the present disclosure comprises at least about 50% by weight a polyetheramine and about 0.2% to about 10% by weight of dicyandiamide. The polyetheramine is selected from bis(3-aminopropyl)diethylene glycol ether (available as Ancamine® 1922A), di(2-aminopropylated)diethylene glycol (also referred to as bis(1-amino-1-methylethyl)diethylene glycol ether, available as Jeffamine® XTJ-511), bis(3-aminopropyl)ethylene glycol ether, bis(3-aminopropyl)polypropylene glycol ether (Jeffamine® D230, D400, D2000), tri(1-amiono-1-methylethyl)trimethylolpropane ether (available as Jeffamine® T-403), bis(3-aminopropyl)polytetrahydrofuran 350, bis(3-aminopropyl)polytetrahydrofuran 750, or triethylene glycol diamine (available as Jeffamine® XTJ 504).

In another embodiment, the liquid curing agent composition of the present disclosure comprises at least about 50% by weight an amine-epoxy adducts and about 0.2% to about 10% by weight of dicyandiamide. The amine-epoxy adduct is the reaction product of DETA, TETA, 4,4'-di(aminocyclohexyl)methane, IPDA, MXDA, or NAEP, with an epoxy resin of diglycidyl ethers of bisphenol-A and bisphenol-F, the advanced diglycidyl ethers of bisphenol-A and bisphenol F, styrene oxide, cyclohexene oxide and the glycidyl ethers of phenol, the cresols, tert-butylphenol, butanol, or C8 to C14 alcohols and the like.

In other embodiments, the liquid curing agent composition of the present disclosure comprises at least about 50% by weight of a polyamine and about 0.2% to about 10% by weight of dicyandiamide. The polyamine comprises the mixture of at least one major polyamine and at least one minor polyamine, wherein the major polyamine is at least about 70% by weight of the total polyamine, and the minor polyamine is less than about 30% by weight of the total polyamine, or at least about 80% by weight of the major polyamine and less than about 20% by weight of the minor polyamine, or at least about 90% by weight of the major polyamine and less than about 10% by weight of the minor polyamine.

In another embodiment, the liquid curing agent composition of the present disclosure comprises at least about 50% by weight of a polyamine and about 0.2% to about 10% by weight of dicyandiamide. The polyamine comprises the mixture of at least one major polyamine and at least one minor polyamine, wherein the major polyamine is at least about 70% by weight of the total polyamine, and is at least one selected from an aliphatic polyamine, heteroaliphatic polyamine, or a cycloaliphatic polyamine; and the minor polyamine is less than about 30% by weight of the total polyamine, and is at least one selected from a aliphatic polyamine, a polyetheramine, or a cycloaliphatic polyamine.

In another embodiment, the liquid curing agent composition of the present disclosure comprises at least about 50% by weight of a polyamine and about 0.2% to about 10% by weight of dicyandiamide. The polyamine comprises the mixture of at least one major polyamine and at least one minor polyamine. The major polyamine is at least about 70% by weight of the total polyamine, and is at least one member selected from diethylenetriamine (DETA), triethylenetetramine (TETA), 1,2-diaminocyclohexane, 4,4'-di(aminocyclohexyl)methane, isophorone diamine (IPDA), norbornane diamines, 1,3-bis(aminomethyl)cyclohexane, 1-cyclohexylamino-3-aminopropane, N-aminoethylpiperazine (NAEP), piperazine, 4,4'-trimethylenedipiperidine, or 1,4-bis(3-aminopropyl)piperazine. The minor polyamine is less than about 30% by weight of the total polyamine, and is at least one member selected from diethylenetriamine (DETA), 1,2-diaminocyclohexane, bis(3-aminopropyl)diethylene glycol ether (available as Ancamine® 1922A), bis(3-aminopropyl)ethylene glycol ether, bis(3-aminopropyl)polypropylene glycol ether (Jeffamine® D230, D400, D2000, D4000), tri(1-amiono-1-methylethyl)trimethylolpropane ether (available as Jeffamine® T-403), or triethylene glycol diamine (available as Jeffamine® XTJ 504).

In another embodiment, the liquid curing agent composition of the present disclosure comprises at least about 50% by weight of a polyamine and about 0.2% to about 10% by weight of dicyandiamide. The polyamine comprises at least one major polyamine and at least one minor polyamine. The major polyamine is at least about 70% by weight of the total polyamine, and is at least one selected from 4,4'-di(aminocyclohexyl)methane, norbornane diamines, 1,3-bis(aminomethyl)cyclohexane, 1-cyclohexylamino-3-aminopropane, piperazine, or 4,4'-trimethylenedipiperidine. The minor polyamine is less than about 30% by weight of the total polyamine, and is at least one selected from diethylenetriamine (DETA), 1,2-diaminocyclohexane, bis(3-aminopropyl)diethylene glycol ether (available as Ancamine® 1922A), bis(3-aminopropyl)ethylene glycol ether, or triethylene glycol diamine (available as Jeffamine® XTJ 504).

In the foregoing embodiments, the remainder of the composition of the liquid curing agent can comprise at least one solvent/plasticizer. For example, a liquid curing agent comprising about 50 wt. % amine, about 10 wt. % dicyandiamine, and 40 wt % of benzyl alcohol.

One aspect of the present disclosure includes an amine-epoxy composition comprising the reaction product of 1) a liquid curing agent composition; and 2) an epoxy component comprising at least one multi-functional epoxy resin. The liquid curing agent composition comprising at least about 50% by weight of a polyamine, and about 0.2% to about 10%, or about 0.2% to about 8%, or about 0.2% to about 6%, or about 0.2 to about 5%, or about 0.2 to about 4% by weight of dicyandiamide, wherein the polyamine is at least one selected from aliphatic polyamines, cycloaliphatic polyamines, heterocyclic polyamines, polyetheramines, aromatic polymers, amidoamines, or amine-epoxy adducts prepared by the reaction of an aliphatic amine, cycloaliphatic amine, heterocyclic, polyether amine, or aromatic amine with an epoxy resin.

One aspect of the present disclosure includes an amine-epoxy composition comprising the reaction product of 1) a liquid curing agent composition; and 2) an epoxy component comprising at least one multi-functional epoxy resin. The liquid curing agent composition comprising at least about 50% by weight of a polyamine, and about 0.2% to about 10%, or about 0.2% to about 8%, or about 0.2% to about 6%, or about 0.2 to about 5%, or about 0.2 to about 4% by weight of dicyandiamide, wherein the polyamine is at least one selected from aliphatic polyamines, cycloaliphatic polyamines, heterocyclic polyamines, polyetheramines, aromatic polymers, amidoamines, or amine-epoxy adducts prepared by the reaction of an aliphatic amine, cycloaliphatic amine, heterocyclic, polyether amine, or aromatic amine with an epoxy resin. In the amine-epoxy composition, the ratio of the number of the equivalent of the reactive amine hydrogen in the liquid curing agent composition to the number of the equivalent of epoxide present in the epoxy component is about 0.7 to about 1.3, about 0.7 to about 1.1, about 0.7 to about 1.0, about 0.8 to about 1.3, about 0.8 to about 1.1, about 0.8 to about 1.0, and in some cases about 0.9 to about 1.3.

Another aspect of the present disclosure includes an amine-epoxy composition comprising the reaction product of 1) a liquid curing agent composition; and 2) an epoxy component comprising at least one multi-functional epoxy resin. The liquid curing agent composition comprising at least about 50% by weight of a polyamine, and about 0.2% to about 10% by weight of dicyandiamide, wherein the polyamine comprises the mixture of at least one major polyamine and at least one minor polyamine, wherein the major polyamine is at least about 70% by weight of the total polyamine, and the minor polyamine is less than about 30% by weight of the total polyamine, or at least about 80% by weight of the major polyamine and less than about 20% by weight of the minor polyamine, or at least about 90% by weight of the major polyamine and less than about 10% by weight of the minor polyamine. In the amine-epoxy composition, the ratio of the number of the equivalent of the reactive amine hydrogen in the liquid curing agent composition to the number of the equivalent of epoxide present in the epoxy component is about 0.7 to about 1.3, about 0.7 to about 1.1, about 0.7 to about 1.0, about 0.8 to about 1.3, about 0.8 to about 1.1, about 0.8 to about 1.0, and in some cases about 0.9 to about 1.3.

Another aspect of the present disclosure includes an amine-epoxy composition comprising the reaction product of 1) a liquid curing agent composition; and 2) an epoxy component comprising at least one multi-functional epoxy resin. The liquid curing agent composition includes at least about 50% by weight of an amidoamine or a polyamide, and about 0.2% to about 10% by weight of dicyandiamide. In the amine-epoxy composition, the ratio of the number of the equivalent of the reactive amine hydrogen in the liquid curing agent composition to the number of the equivalent of epoxide present in the epoxy component is about 0.7 to about 1.3, about 0.7 to about 1.1, about 0.7 to about 1.0, about 0.8 to about 1.3, about 0.8 to about 1.1, about 0.8 to about 1.0, and in some cases about 0.9 to about 1.3.

Amine-epoxy compositions of the present disclosure comprise the reaction product of a curing agent composition and an epoxy composition comprising at least one multi-functional epoxy resin. Multifunctional epoxy resin, as used herein, describes compounds containing 2 or more 1,2-epoxy groups per molecule. Epoxide compounds of this type are well known to those of skill in the art.

One embodiment of the disclosure includes amine-epoxy resin compositions that require a reduced amount of liquid curing composition, at an amine/epoxy stoichiometric ratio of 1 or less while achieving the same and faster cure rate quantified by reaching the same viscosity at similar or shorter time. The utilization of the inventive liquid curing agent composition permits decreased processing time, and increases the throughput.

One class of epoxy resins suitable for use in the present disclosure comprises the glycidyl ethers of polyhydric phenols, including the glycidyl ethers of dihydric phenols. Illustrative examples include, but are not limited to, the glycidyl ethers of resorcinol, hydroquinone, bis-(4-hydroxy-3,5-difluorophenyl)-methane, 1,1-bis-(4-hydroxyphenyl)-ethane, 2,2-bis-(4-hydroxy-3-methylphenyl)-propane, 2,2-bis-(4-hydroxy-3,5-dichlorophenyl) propane, 2,2-bis-(4-hydroxyphenyl)-propane (commercially known as bisphenol A), bis-(4-hydroxyphenyl)-methane (commercially known as bisphenol F, and which may contain varying amounts of 2-hydroxyphenyl isomers), and the like, or any combination thereof. Additionally, advanced dihydric phenols of the following structure also are useful in the present disclosure:

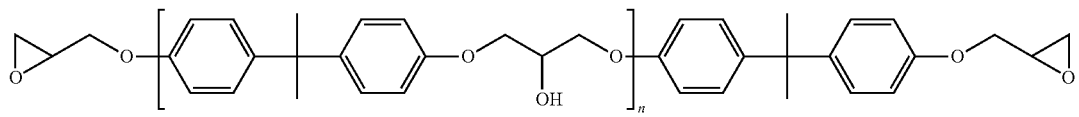

where n is an integer, and R is a divalent hydrocarbon radical of a dihydric phenol, such as those dihydric phenols listed above. Materials according to this formula can be prepared by polymerizing mixtures of a dihydric phenol and epichlorohydrin, or by advancing a mixture of a diglycidyl ether of the dihydric phenol and the dihydric phenol. While in any given molecule the value of n is an integer, the materials are invariably mixtures which can be characterized by an average value of n which is not necessarily a whole number. Polymeric materials with an average value of n between 0 and about 7 can be used in one aspect of the present disclosure.

In another aspect, epoxy novolac resins, which are the glycidyl ethers of novolac resins, can be used as multifunctional epoxy resins in accordance with the present disclosure. In yet another aspect, the at least one multifunctional epoxy resin is a diglycidyl ether of bisphenol-A (DGEBA), an advanced or higher molecular weight version of DGEBA, a diglycidyl ether of bisphenol-F, an epoxy novolac resin, or any combination thereof. Higher molecular weight versions or derivatives of DGEBA are prepared by the advancement process, where excess DGEBA is reacted with bisphenol-A to yield epoxy terminated products. The epoxy equivalent weights (EEW) for such products range from about 450 to about 3000 or more. Because these products are solid at room temperature, they are often referred to as solid epoxy resins.

DGEBA or advanced DGEBA resins are often used in coating formulations due to a combination of their low cost and generally high performance properties. Commercial grades of DGEBA having an EEW ranging from about 174 to about 250, and more commonly from about 185 to about 195, are readily available. At these low molecular weights, the epoxy resins are liquids and are often referred to as liquid epoxy resins. It is understood by those skilled in the art that most grades of liquid epoxy resin are slightly polymeric, since pure DGEBA has an EEW of about 174. Resins with EEWs between about 250 and about 450, also generally prepared by the advancement process, are referred to as semi-solid epoxy resins because they are a mixture of solid and liquid at room temperature. Generally, multifunctional resins with EEWs based on solids of about 160 to about 750 are useful in the present disclosure. In another aspect the multifunctional epoxy resin has an EEW in a range from about 170 to about 250.

Depending upon the end-use application, it can be beneficial to reduce the viscosity of the amine-epoxy compositions of the present disclosure by modifying the epoxy component. For example, the viscosity can be reduced to allow an increase in the level of pigment in a formulation or composition while still permitting easy application, or to allow the use of a higher molecular weight epoxy resin. Thus, it is within the scope of the present disclosure for the epoxy component, which comprises at least one multifunctional epoxy resin, to further comprise a monofunctional epoxide. Examples of monoepoxides include, but are not limited to, styrene oxide, cyclohexene oxide and the glycidyl ethers of phenol, cresols, tert-butylphenol, other alkyl phenols, butanol, 2-ethylhexanol, C4 to C14 alcohols, and the like, or combinations thereof. The multifunctional epoxy resin can also be present in a solution or emulsion, with the diluent being water, an organic solvent, or a mixture thereof. The amount of multifunctional epoxy resin can range from about 50% to 100%, about 50% to about 90%, about 60% to about 90%, about 70% to 90%, and in some cases about 80% to about 90% by weight of the epoxy component.

Particularly suitable polyepoxy compounds are the diglycidyl ethers of bisphenol-A and bisphenol-F, the advanced diglycidyl ethers of bisphenol-A and bisphenol-F, and the epoxy novolac resins. The epoxy resin can be a single resin, or it can be a mixture of mutually compatible epoxy resins.

The relative amount of the liquid curing agent composition of the present disclosure versus the amount of epoxy component in the amine-epoxy composition can vary depending upon, for example, the end-use article, its desired properties, and the fabrication method and conditions used to produce the end-use article. For instance, in coating applications using certain amine-epoxy compositions, incorporating more epoxy resin relative to the amount of the liquid curing agent composition, can result in coatings which have increased drying time, but with increased hardness and improved appearance as measured by gloss. Amine-epoxy compositions of the present disclosure generally have stoichiometric ratios of active amine hydrogens in the liquid curing agent composition to the epoxy groups in the epoxy component, amine/epoxy ratio, ranging from about 0.7 to about 1.3. For example, such amine-epoxy compositions can have stoichiometric ratios of about 0.7, about 0.8, about 0.9, about 1.0, about 1.1, about 1.2, or about 1.3.

Embodiments of the disclosure include amine-epoxy resin compositions that require a reduced amount of liquid curing composition, at an amine/epoxy stoichiometric ratio of 1 or less while achieving the same and faster cure rate. The utilization of the liquid curing agent composition as disclosed permits decreased processing time, and increases the throughput.

The epoxy component is from about 30% to about 80% by weight of the amine-epoxy composition, or between about 40% to about 80%, or about 45% to about 80%, or about 45% to about 85%, or about 50% to about 80%, or about 50% to about 85% by weight.

The amine/epoxy composition of the present disclosure can be cured at a temperature ranging from 0° C. to 150° C., about 5° C. to about 135° C., 20° C. to about 150° C., about 20° C. to about 110° C., about 5° C. to about 50° C., about 5° C. to about 40° C., about 5° C. to about 35° C., about 10° to about 50° C., about 10° C. to about 35° C., about 25° C. to about 120° C., about 40° C. to about 110° C., about 50° C. to about 150° C., about 50° C. to 135° C., in some cases about −50° C. to about −110° C. depending on application and end-use. For example, coatings and adhesive can be applied at temperature below ambient, while polymer composite can be cured at above ambient temperature of 23° C.

Mixing of the curing component and the epoxy component to form the epoxy resin composition can be in any order and by any appropriate means known in the art for two component epoxy compositions. One example comprises premixing epoxy component and curing agent component separately, then adding curing agent component to the epoxy resin component and mixing thoroughly with a mechanical mixer.

In some circumstances it may be advantageous to incorporate so-called accelerators for the epoxy-amine curing reaction in formulations using the liquid curing agent of the present disclosure. Such accelerators are known to those skilled in the art. Suitable accelerators include various organic acids, alcohols, phenols, tertiary amines, hydroxylamines, and the like. Particularly useful accelerators include at least one of benzyl alcohol, phenol, alkyl substituted phenols such as nonylphenol, octylphenol, t-butylphenol, cresol and the like, bisphenol-A, salicylic acid, dimethylaminomethylphenol, bis(dimethylaminomethyl)phenol, and tris(dimethylaminomethyl)phenol. Normally, such accelerators are used at levels of about 10% or less based on the total weight of the liquid curing agent, or about 7% or less, or about 5% or less, or about 3% or less.

In some circumstances it may be advantageous to incorporate plasticizers for the epoxy-amine network in formulations using the liquid curing agent of the current disclosure. This is particularly useful in cases where, in the absence of such a plasticizer, the glass transition temperature, Tg, of the composition significantly exceeds the ambient temperature before the degree of reaction necessary to meet certain requirements such as solvent and chemical resistance and tensile strength has been achieved. Particularly useful plasticizers include benzyl alcohol, nonylphenol, and various esters of phthalic acid. The ester plasticizers would normally be incorporated in the same package as the epoxy resin to minimize reaction with the amine curing agent. Another particularly useful class of plasticizers is hydrocarbon resins, which include toluene-formaldehyde condensates such as EPODIL® L, xylene-formaldehyde condensates such as NIKANOL® Y50, coumarone-indene resins, and many other hydrocarbon resin modifiers well know to those skilled in the art. EPODIL® is a registered trademark of Air Products & Chemicals, Inc. NIKANOL® is a registered trademark of Mitsubishi Gas Chemical Company, Inc. The amount of plasticizer can range from about 4% to 30%, about 5% to 25%, about 5% to 20%, and in some cases about 5% to about 15% by weight of the epoxy-amine composition.

Epoxy-amine compositions of the present disclosure can be used to produce various articles of manufacture. Depending on the requirements during the manufacturing of or for the end-use application of the article, various additives can be employed in the formulations and compositions to tailor specific properties. These additives include, but are not limited to, solvents (including water), accelerators, plasticizers, fillers, fibers such as glass or carbon fibers, pigments, pigment dispersing agents, rheology modifiers, thixotropes, flow or leveling aids, surfactants, defoamers, biocides, or any combination thereof. The amount of these additives can range from about 5% to about 80%, about 5% to about 70%, about 5% to about 65%, about 5% to about 55%, about 5% to about 50%, about 5% to about 40%, about 5% to about 35%, about 5% to about 30%, about 5% to about 25%, about 5% to about 20% and in some cases about 5% to about 15% by weight to epoxy-amine composition. It is understood that other mixtures or materials that are known in the art can be included in the compositions or formulations and are within the scope of the present disclosure.

One embodiment of the present disclosure includes an epoxy composite. To form an epoxy composite, the epoxy resin composition includes reinforcing fibers. Reinforcing fibers for the fiber composite of the present disclosure may include customary fibers which are used for fiber reinforcement of materials. Suitable reinforcing fibers include organic or inorganic fibers, natural fibers or synthetic fibers, and may be present in the form of wovens or non-crimp fabrics, nonwoven webs or mats, and also in the form of fiber stands (rovings), or staple fiber formed of continuous or discontinuous fiber such as fiberglass, E glass fiber, S glass fiber, S-2 GLASS®, fiber or C glass, fiber, silicon carbide or disilicon carbide containing titanium fiber, carbon/graphite fiber, boron fiber, quartz, aluminium oxide, carbon nanotubes, nano composite fibers, polyaramide fibers such as those sold under the trade name KEVLAR®, Poly (p-phenylene benzobisoxazole) fiber such as those sold under the trade name ZYLON®, ultrahigh molecular weight polyethylene fibers such as those sold under the trade name SPECTRA®, high and low density polyethylene fibers, polypropylene fibers, nylon fibers, cellulose fibers, natural fibers, biodegradable fibers and combinations thereof. Other suitable fibers include silicon carbide fiber, such as NICALON™ from Nippon Carbon Company; and Silicon carbide fibers containing titanium, such as TYRRANO™ from Ube America, Inc. S-2 GLASS® is a registered trademark of AGY Holding Corp. KEVLAR® is a registered trademark of E. I. du Pont de Nemours and Company. ZYLON® is a registered trademark of Toyo Boseki Kabushiki Kaisha, Ta Toyobo Co., Ltd. SPECTRA® is a registered trademark of Honeywell International Inc.

These fibers (wovens or non-woven) can be coated with the solvent or solvent free epoxy resin mixture by the standard impregnating methods, in particular for filament winding, pultrusion, sheet molding compound, bulk molding compound autoclave molding, resin infusion, vacuum assisted resin transfer molding, hand lay-up, resin impregnation, prepreg, compression molding, brushing, spraying, or dipping, casting, injection molding or combination thereof.

The present disclosure also is directed to articles of manufacture comprising the compositions disclosed herein. For example, an article can comprise an amine-epoxy composition which comprises the reaction product of the liquid curing agent composition of the present disclosure and an epoxy composition. Articles of manufacture produced from amine-epoxy compositions disclosed herein include, but are not limited to, adhesives, coatings, primers, sealants, curing compounds, construction products, flooring products, and composite products. Further, such coatings, primers, sealants, or curing compounds can be applied to metal or cementitious substrates.

Coatings based on these amine-epoxy compositions can be solvent-free or can contain diluents, such as water or organic solvents, as needed for the particular application. Coatings can contain various types and levels of pigments for use in paint and primer applications. Amine-epoxy coating compositions comprise a layer having a thickness ranging from 40 to 400 μm (micrometer), preferably 80 to 300 μm, more preferably 100 to 250 μm, for use in a protective coating applied on to metal substrates. In addition, for use in a flooring product or a construction product, coating compositions comprise a layer having a thickness ranging from 50 to 10,000 μm, depending on the type of product and the required end-properties. A coating product that delivers limited mechanical and chemical resistances comprises a layer having a thickness ranging from 50 to 500 μm, preferably 100 to 300 μm; whereas a coating product such as, for example, a self-leveling floor that delivers high mechanical and chemical resistances comprises a layer having a thickness ranging from 1,000 to 10,000 µm, preferably 1,500 to 5,000 µm.

The following Examples are provided to illustrate certain aspects or embodiments of the instant invention and shall not limit the scope of the claims appended hereto.

EXAMPLES

Example 1

Formulations of liquid curing agent composition containing various polyamines and several levels of dicyandiamide were prepared, and shown in Table 1. The gel time characterizes the time a composition transitions from a liquid to a gel. The gel time of the amine-epoxy compositions was measured with a TECHNE gelation timer model FGT 6. The one end of the metal rod was connected to the TECHNE gelation timer and the other end with the 22 mm diameter stainless steel plunger. A total of 150 grams of the mixture comprising the liquid amine curing agent composition was mixed stoichiometrically and thoroughly (amine/epoxy ratio was 1:1) with the epoxy component of standard bisphenol-A based epoxy resin of (Epon 828, EEW 190) for 2-3 minutes in an 8 oz plastic jar at 25° C. The gelation timer was turned to "start/hold" when the mixing started to start the timer. After mixing, the stainless steel plunger was immersed into epoxy-liquid curing agent mixture and gel timer was turned to "start/operate". Gel time was recorded in minutes at 25° C.

TABLE 1

Gel time of amine-epoxy composition.

| | wt % dicy | | |
|---|---|---|---|
| | 10% | 5% | 0% |
| | Gel time (minute) | | |
| mXDA | 20.7 | 27.7 | 43.7 |
| IPDA | 22.2 | 31.0 | 64.0 |
| PACM | 21.8 | 27.4 | 138 |
| Ancamine 2655 | 12.1 | 16.1 | 36.1 |
| Ancamide 506 | | 64.6 | 315.5 |
| Ancamide 350A | | 60.0 | 218.5 | dicy—dicyandiamide, PACM—4,4'-di(aminocyclohexyl)methane, Ancamine® 2655—N,N'-bis(3-aminopropyl)ethylenediamine, Ancamide® 506—an amidoamine based on TOFA and TEPA, Ancamide® 350A—a polyamide based on TOFA, dimer acid and TEPA; all were obtained from Air Products & Chemicals, Inc.

The gel time data in Table 1 clearly indicated that liquid curing agent compositions containing dicyandiamide cured much faster than the same curing agent without dicyandiamide.

Example 2

Formulations of liquid curing agent composition containing various polyamines and 30% benzyl alcohol were prepared, and shown in Table 2. Gel time was recorded as described in Example 1.

TABLE 2

Gel time of amine-epoxy composition.

| | % dicy | | |
|---|---|---|---|
| | 6.4% | 3.4% | 0% |
| | Gel time (minute) | | |
| mXDA | 17.2 | | 40.2 |
| IPDA | 20.9 | | 56.3 |
| PACM | | 32.6 | 60.5 |
| Ancamine 2655 | 12.2 | | 23.6 |

All curing agents contain 30% benzyl alcohol.

The gel time data in Table 2 clearly indicate that liquid curing agent compositions containing 30% by weight of benzyl alcohol and dicyandiamide cured much faster than the same curing agent without dicyandiamide.

Example 3

Formulations of liquid curing agent composition containing PACM, 30% benzyl alcohol, and accelerator dicyandiamide, K54 or salicylic acid at 3.5% by weight to total curing agent weight were prepared, and shown in Table 3. Gel time was recorded as described in Example 1. Amine-epoxy coatings were prepared using standard bisphenol-A based epoxy resin of (Epon® 828, EEW 190) at amine-epoxy stochiometry of 1:1. The coatings were prepared at a wet film thickness of about 6 mils, cured at a temperature-controlled room of 23° C. and 50% relative humidity (RH) for 7 days. The coatings were then exposed to UV A light, and the delta yellowness index was measured according to ASTM E313-10 under D65 illuminant at 1 day, 3 day and 7 day UV light exposure.

TABLE 3

Delta yellowness index and gel time of amine-epoxy composition

| | | Curing agent | | | |
|---|---|---|---|---|---|
| | | 1 | 2 | 3 | 4 |
| amine | PACM | 70.0 | 66.5 | 66.5 | 66.5 |
| accelerator | dicy | | 3.5 | | |
| | K54 | | | 3.5 | |
| | Salicylic acid | | | | 3.5 |
| delta | 1-day | 20.6 | 18.2 | 32.8 | 54.7 |
| yellowness | 3-day | 36.5 | 28.8 | 43.4 | 63.6 |
| index | 7-day | 48.0 | 48.7 | 56.8 | 69.3 |
| Gel time | (minute) | 60.5 | 32.6 | 28.4 | 57.3 |

As shown in Table 3, curing agents 1, 3, and 4 are comparative curing agents, and curing agent 2 is the inventive curing agent. The gel time data in table 3 indicate that liquid curing agent 2 containing dicyandiamide cured much faster than curing agent 1 without dicyandiamide. Amine-epoxy coating using liquid curing agent 2 of the present disclosure containing 3.5% dicyandiamide showed similar yellowness index to the coating using curing agent 1 without any accelerator, but less yellowing than those using curing agent 3 and 4 with salicylic acid or K54 accelerator.

Example 4

Formulations of liquid curing agent composition containing Ancamine® 2143 (a PACM-DGEBA adduct in benzyl alcohol), and accelerator dicyandiamide, K54 or salicylic acid at 2.5% by weight to total curing agent weight were prepared, and shown in Table 3. The preparation of amine-epoxy coatings and measurement of delta yellowness index were described in Example 3.

TABLE 4

Delta yellowness index of amine-epoxy composition

|  |  | Curing agent | | | |
|---|---|---|---|---|---|
|  |  | 1 | 2 | 3 | 4 |
| accelerator | Ancamine 2143 | 100 | 97.5 | 97.5 | 97.5 |
|  | Dicy |  | 2.5 |  |  |
|  | salicylic acid |  |  | 2.5 |  |
|  | K-54 |  |  |  | 2.5 |
| delta yellowness index | 1-day | 10.5 | 5.2 | 24.5 | 40.5 |
|  | 3-day | 17.1 | 14.4 | 41.2 | 49.4 |
|  | 7-day | 26.8 | 34.2 | 58.2 | 59.0 |

As shown in Table 4, curing agents 1, 3, and 4 are comparative curing agents, and curing agent 2 is the inventive curing agent. The data in Table 4 clearly indicated the amine-epoxy coating using liquid curing agent 2 of the present disclosure containing 2.5% dicyandiamide showed similar yellowness index compared to that of the control coating using curing agent 1 without any accelerator, but less yellowing than those using curing agent 3 and 4 with salicylic acid or K54 accelerator.

Example 5

Formulations of liquid curing agent composition containing MXDA or 4,4-di(aminocyclohexyl)methane (PACM) with or without dicyandiamide in 30% by weight of benzyl alcohol were prepared. Curing agents 1, and 3 are the inventive curing agents, and curing agents 2 and 4 are comparative curing agents. Curing agent 1 is compared with curing agent 2, and curing agent 3 is compared with curing agent 4. The preparation of amine-epoxy coatings was described in Example 3. The formulations measurement data are summarized in Table 5.

The dry time or thin film set time (TFST) was determined at 23° C. and 50% relative humidity (RH) using a Beck-Koller recorder, in accordance with ASTM D5895. The amine-epoxy coatings were prepared on glass panels at a wet film thickness of about 6 mils. The coatings with liquid curing agents containing dicydiamide had similar or shorter dry time than those using curing agents without dicyandiamide at 23° C. and 5° C.

The Persoz hardness test results were obtained after 1 day, 3 days, and 7 days cure at 23° C. and 50% RH. Coatings were applied to glass panels and tested in accordance with ISO 1522. As shown in Table 5, the coating using liquid curing agents containing dicyandiamide had similar Persoz hardness development to the coating using curing agents without dicyandiamide at 23° C. and 5° C. Table 5 lists the 200 gloss test results after 1 day, 3 days, and 7 days, respectively, at 23° C. and 50% RH. Coatings were applied to glass and tested in accordance with ASTM D523. The gloss was measured at an angle of 20° using a Gardner gloss meter. Measurements were made with the glass panel placed on a black cardboard background. Results shown are the average of 10 measurements. As shown in Table 5, the coating using liquid curing agents containing dicyandiamide had similar or better gloss than the coating using curing agents without dicyandiamide at 25° C. and 5° C. Especially for the coating with liquid curing agent 1 containing MXDA and dicyandiamide showed much higher gloss than that the coating using curing agent 2 without dicyandiamide.

The impact resistance test was carried out in accordance with D2794-93 with coatings on metal panels cured for 7 days cure at 23° C. 50% RH. As shown in Table 5, the coating using liquid curing agents 1 and 3 of the present disclosure containing dicyandiamide had similar or better impact resistance than the coating using comparative curing agent 2 and 4 without dicyandiamide.

The thermal properties of the amine-epoxy composition such as glass transition temperature Tg, peak exotherm temperature and percent cure were measured by DSC. About 5 grams of the amine-epoxy composition was mixed 3 cycles using FlackTeK DAC 250 SP SpeedMixer™ by Hauschild. About 10 mg samples were placed in Tzero hermetic DSC pans and were sealed in air. The samples were analyzed using a TA Instruments Q2000 DSC calibrated in T4P mode at heating rate of 10° C./min with Indium. The samples were heated from −70° C. to 300° C. at 10° C./min, then cooled back to −70° C. and the test was repeated. As shown in Table 5, compared with the amine-epoxy composition using comparative curing agent 4 without dicyandiamide, the composition using liquid curing agent 3 of the present disclosure showed the same Tg, lower peak exotherm temperature, and higher degree of cure.

The semi-quantitative analysis of amine-epoxy composition was carried out by near infrared spectroscopy (NIR). The conversion of oxirane (epoxy) and primary amine during the cure was monitored by the C—H stretch of oxiran ring at 1646 cm$^{-1}$, and the N—H stretch of the primary amine at 2026 cm$^{-1}$, respectively. About 5 grams of the amine-epoxy composition was mixed using FlackTeK DAC 250 SP SpeedMixer™ by Hauschild. After mixing, the sample was placed in a disposable sample cell of 0.8 mm path length, and placed in a 25° C. oven. The NIR spectrometer used for the analysis was a Model 6500 near-infrared spectrometer equipped with an Interactance probe by Foss NIR Systems, Inc. The IR spectra were collected over about 24 hours, and the spectra were analyzed using GRAMS software. FIG. 1 shows the conversion of epoxy and primary amine in amine-epoxy composition using curing agent 1 (63.7 wt % MXDA/6.3 wt % dicy/30 wt % benzyl alcohol) of the present disclosure and the amine-epoxy composition using comparative curing agent 2 (70 wt % MXDA/30 wt % benzyl alcohol). FIG. 1 clearly indicated that amine-epoxy composition had higher conversion of epoxy group and primary amine group using curing agent 1 than the comparative curing agent 2.

TABLE 5

|  |  | Curing agents | | | |
|---|---|---|---|---|---|
|  |  | 1 | 2 | 3 | 4 |
|  | MXDA | 63.7 | 70.0 |  |  |
|  | PACM |  |  | 66.6 | 70.0 |
|  | Dicy | 6.3 |  | 3.4 |  |
| TFST (25° C.) (hour) | phase 1 | 1.6 | 2.8 | 2.3 | 2.9 |
|  | phase 2 | 2.6 | 3.8 | 4.9 | 5.4 |
|  | phase 3 | 2.8 | 4.2 | 6.2 | 6.4 |
|  | phase 4 | 3.4 | 4.8 | 8.0 | 8.0 |
| Persoz (25° C.) | 1 day | 303 | 336 | 243 | 242 |
|  | 3 days | 320 | 345 | 279 | 293 |
|  | 7 days | 330 | 339 | 273 | 307 |
| Gloss (20°) (25° C.) | 1 day | 158 | 18 | 134 | 124 |
|  | 3 days | 154 | 19 | 133 | 126 |
|  | 7 day | 153 | 19 | 133 | 123 |
| TFST (5° C.) (hour) | phase 1 | 3.2 | 5.6 | 4.0 | 8.0 |
|  | phase 2 | 5.8 | 8.5 | 12.0 | 15.4 |

TABLE 5-continued

|  |  | Curing agents | | | |
|---|---|---|---|---|---|
|  |  | 1 | 2 | 3 | 4 |
|  | phase 3 | 6.0 | 9.3 | 14.6 | 16.8 |
|  | phase 4 | 10.0 | 9.9 | 16.0 | >24 |
| Persoz (5° C.) | 1 day | 133 | 187 | 27 | 26 |
|  | 3 days | 222 | 264 | 117 | 174 |
|  | 7 days | 289 | 323 | 194 | 218 |
| Gloss (20°) (5° C.) | 1 day | 4 | 9 | 39 | 37 |
|  | 3 days | 32 | 14 | 76 | 67 |
|  | 7 days | 23 | 13 | 72 | 36 |
| Impact resistance after 7 days (in-lb) | Direct | 20 | 20 | 24 | 20 |
|  | Reverse | <4 | <4 | <4 | <4 |
| Tg by DSC | (° C.) |  |  | 118.3 | 118.4 |
| DSC Exotherm peak temperature | (° C.) |  |  | 95.1 | 104.1 |
| Cure % by DSC (25° C.) | 1 day |  |  | 87.3% | 78.5% |
|  | 7 day |  |  | 90.6% | 79.7% |

All curing agents contain 30% by weight of benzyl alcohol.

Example 6

Formulations of liquid curing agent compositions were prepared, as shown in Table 6. Curing agents 2, 3, 5, and 7 are the inventive curing agents, and curing agents 1, 4 and 6 are comparative curing agents. Curing agents 2 and 3 are compared with curing agent 1, and curing agent 5 is compared with curing agent 4, and curing agent 7 is compared with curing agent 6. Amine-epoxy coatings were prepared using standard bisphenol-A based epoxy resin of (Epon® 828, EEW 190) at amine-epoxy stochiometry of 1:1. The compositions were mixed using two one-minute cycles on the FlackTeK DAC 250 SP SpeedMixer™ by Hauschild, and the viscosity profiles of the compositions were then measured using the Cure Profile Rheometer (CPR) outfitted with ⅝" diameter probes to improve sensitivity in the lower viscosity range. After mixing, the samples were placed into a thermally pre-equilibrated block on the CPR for viscosity testing. The viscosity profiles are shown in FIGS. 2-4.

As shown in FIG. 2, the amine-epoxy composition using liquid curing agent 2 and 3 containing dicyandiamide displayed much faster viscosity build-up than that using comparative curing agent 1 without any dicyandiamide. The same finding was observed in composition using curing agent 5 versus using comparative curing agent 4 in FIG. 3, and curing agent 7 versus comparative curing agent 6 in FIG. 4. Dicyandiamide in the liquid curing agent composition of the present disclosure accelerated the cure of amine-epoxy composition.

TABLE 6

| curing agent | 1 | 2 | 3 | 4 | 5 | 6 | 7 |
|---|---|---|---|---|---|---|---|
| dicy |  | 5.7 | 3.4 |  | 4.8 |  | 9.1 |
| PACM | 70.0 | 64.3 | 66.6 |  |  |  |  |
| Ancamide 506 |  |  |  | 100 | 95.2 |  |  |
| Ancamine 1922 |  |  |  |  |  | 100 | 90.9 |
| benzyl alcohol | 30.0 | 30.0 | 30.0 |  |  |  |  |
| Cure temp. (° C.) | 5 | 5 | 5 | 25 | 25 | 25 | 25 |

Example 7

Several curing agent formulations were prepared as shown in Table 7. These curing agents were used to cure the epoxy component using diglycidyl ether of bisphenol A epoxy resin (Epon 828, EEW 190) at varied stoichiometric ratio of amine/epoxy.

Curing agent 1 is a comparative example to compare with curing agent 2, and comparative curing agent 3 versus curing agent 4, comparative curing agent 5 versus curing agent 6, and comparative curing agent 7 versus curing agent 8.

The amine-epoxy composition containing epoxy component and the liquid curing agents were hand mixed at 40° C. for 3-5 minutes. Entrapped air was removed by placing the mixture in a centrifuge for 5 minutes or until the mixture was clear. The mixture was then poured into a ⅛" aluminum mold. The system in the mold was cured at 80° C. for 2 hours plus 150° C. for 3 hours. Molds were allowed to cool to room temperature before removing the cured sample. Specimens were prepared from the cast samples according to ASTM methods to perform the mechanical testing; tensile test (ASTM D638), flexural test (ASTM D790), and compressive (ASTM D695).

The T-peel strength test was carried out in accordance with ASTM D-1876 and lap shear test in accordance with ASTM D-1002. The formulations for the tests are listed in Table 8.

As shown in Table 7, for thermal properties, the curing agents of the present disclosure containing dicyandiamide showed much lower heat of cure, onset exotherm temperature, and peak exotherm temperature, while maintaining Tg, compared to the corresponding comparative curing agent without dicyandiamide.

Also shown in Table 7, the epoxy cured by liquid curing agents of the present disclosure showed improved mechanical properties compared with epoxy cured by the comparative curing agents without dicyandiamide.

TABLE 7

| Amine-epoxy composition by heat cure | | | | | | | | |
|---|---|---|---|---|---|---|---|---|
| curing agent | 1 | 2 | 3 | 4 | 5 | 6 | 7 | 8 |
| dicy |  | 9.1 |  | 8.2 |  | 4.8 |  | 8.2 |
| MXDA | 100 | 90.9 |  |  |  |  |  |  |
| IPDA |  |  | 100 | 91.8 |  |  |  |  |
| PACM |  |  |  |  | 100 | 95.2 |  |  |
| Ancamine 2655 |  |  |  |  |  |  | 100 | 91.8 |
| amine/epoxy stochiometry | 1 | 1 | 1 | 1 | 1 | 0.9 | 1 | 1 |
| Thermal property | | | | | | | | |
| Tg (° C.) | 122.5 | 124.6 | 156.8 | 154.4 | 156.9 | 158.6 | 121.2 | 124.9 |
| T onset (° C.) | 83.6 | 58.7 | 77.8 | 53.4 | 82.2 | 59.6 | 69.3 | 54.4 |

TABLE 7-continued

| Amine-epoxy composition by heat cure | | | | | | | | |
|---|---|---|---|---|---|---|---|---|
| curing agent | 1 | 2 | 3 | 4 | 5 | 6 | 7 | 8 |
| T peak exotherm (° C.) | 113.9 | 98.3 | 115.1 | 93.7 | 117.7 | 99.3 | 101.9 | 93.4 |
| heat of reaction (J/g) | 515.2 | 378.6 | 551.6 | 337.6 | 516.6 | 394.6 | 494.0 | 418.6 |
| Mechanical Properties | | | | | | | | |
| T-peel strength (lb/in) | 6.1 | 8.8 | 8.6 | 10 | 10.3 | 9.1 | 8.4 | 8.2 |
| Lap shear strength (psi) | 2388 | 3,707 | 3,048 | 3,793 | 2724 | 3,625 | 3,304 | 3,582 |
| Tensile strength(psi) | 11,052 | 12,111 | 7,454 | 9,361 | 8067 | 7,773 | 9,219 | ND |
| Tensile Modulus (psi) | 401,807 | 436,451 | 386,328 | 428,200 | 410,895 | 415,216 | 380,386 | ND |
| % Elongation | 6.6 | 6.3 | 2.4 | 3.5 | 3.7 | 2.9 | 4.2 | ND |
| Flexural strength (psi) | 18,926 | 21,098 | 17,909 | 20,302 | 17,038 | 20,279 | 14,360 | 19,494 |
| Flexural modulus(psi) | 382,221 | 442,601 | 406,568 | 432,606 | 354,442 | 408,958 | 379,319 | 446,336 |
| Comp. strength (psi) | 15,267 | 16,081 | 16,913 | 17,729 | 19,603 | 16,898 | 15,084 | 16,037 |
| Comp. modulus (psi) | 295,453 | 322,344 | 297,673 | 324,573 | 252,221 | 304,025 | 277,503 | 316,752 |

TABLE 8

Formulation for T-peel and lap shear test.

| | | parts |
|---|---|---|
| A side formulation | | |
| Epoxy resin | Epon 828 | 60 |
| Filler | Microtuff AG445 | 38 |
| Additive | Cab-O-Sil TS720 | 2 |
| B side formulation | | |
| Curing Agent | Curing agent | 30 |
| Curing Agent | 1300X42 ATBN | 20 |
| Filler | Microtuff AG445 | 22 |
| Filler | Toyal 101 Al powder | 27 |
| Additive | Cab-O-Sil TS720 | 1 |

Example 8

Various curing agent formulations were prepared as shown in Table 9. These curing agents were used to cure the epoxy component using diglycidyl ether of bisphenol A epoxy resin (Ancarez 4010, EEW 187) at varied stoichiometric ratio of amine/epoxy.

DSC was run from −10° C. to 300° C. at 10° C./min, and Tg was determined at second heating. The viscosity build up was measured at 70° C. and 45° C. using an Anton Paar MCR 302 rheometer equipped with spindle CP50-1.

Curing agents 1 is a comparative example to compare with curing agents 2-8 of the present disclosure. Comparative curing agent 1 contained no accelerator. The curing agents 2-8 of the present disclosure accelerated the cure by reaching viscosity of 10 Pa·s in much shorter time. FIG. 5 shows the viscosity profiles of curing agents 4 and 8 compared with comparative curing agent 1. Amine-epoxy composition using curing agents 4 and 8 containing dicyandiamide showed much faster viscosity build-up at 45° C. Using the liquid curing agent of the present disclosure allowed for lower curing agent usage level at amine/epoxy stochiometry of 0.8 while still achieving faster cure.

In addition, DSC indicated that the epoxy curing process using had lower onset exotherm temperature and peak exotherm temperature using curing agents 4-8 of the present disclosure.

TABLE 9

| Curing agents based on an amidoamide. | | | | | | | | |
|---|---|---|---|---|---|---|---|---|
| Curing agent | 1 | 2 | 3 | 4 | 5 | 6 | 7 | 8 |
| Ancamide 506 | 100 | 97.5 | 97.5 | 97.5 | 98 | 98 | 99 | 99 |
| Dicy | | 2.5 | 2.5 | 2.5 | 2 | 2 | 1 | 1 |
| stochiometry (amine/epoxy) | 0.94 | 1.03 | 0.94 | 0.85 | 1.01 | 0.83 | 0.97 | 0.80 |
| T peak (° C.) | 123.9 | 110.6 | 113.7 | 112.0 | 111.5 | 113.7 | 114.5 | 119.3 |
| T onset (° C.) | 77.3 | 64.5 | 63.3 | 63.9 | 66.9 | 66.3 | 70.6 | 70.4 |
| Tg (° C.) | 54.1 | 44.5 | 47.4 | 49.8 | 47.1 | 50.5 | 46.1 | 45.2 |
| Time to 10 Pa · s (min) @ 70° C. | 31.73 | 14.75 | 15.50 | 16.50 | 17.18 | 18.88 | 20.98 | 23.53 |
| Time to 10 Pa · s (min) @ 45° C. | 89.85 | 43.60 | 44.90 | 46.10 | 49.60 | 51.90 | 61.50 | 63.85 |

Example 9

Various curing agent formulations were prepared as shown in Table 10. These curing agents were used to cure the epoxy component using diglycidyl ether of bisphenol A epoxy resin (Ancarez 4010, EEW 187) at varied stoichiometric ratio of amine/epoxy.

Curing agents 1 is a comparative example. The curing agents 2-14 of the present disclosure accelerated the cure by reaching viscosity of 10 Pa·s in similar or shorter time depending on the composition of the curing agent, and the at amine/epoxy stochiometry. Using the liquid curing agent of the present disclosure allowed for lower curing agent usage level at amine/epoxy stochiometry as low as 0.7 while still achieving faster or similar cure.

As shown in Table 10, PACM (i.e., comprising 5 wt. % - - - and 95 wt. % - - - ) is the major polyamine and DETA, or Ancamine 1922 is the minor polyamine. The properties of the amine/epoxy composition were not significantly affected using the same amount of dicyandiamide with or without the minor polyamine. The liquid curing agent composition is stable and has good shelf life.

DSC was run from −10° C. to 300° C. at 10° C./min, and Tg was determined at second heating. The viscosity build up was measured at 85° C. using rheometer MCR302 and spindle CP50-1.

In addition, DSC indicated that the epoxy curing process using had lower onset exotherm temperature and peak exotherm temperature using curing agents 2-14 of the present disclosure.

TABLE 10

Curing agents based on 4,4-di(aminocyclohexyl)methane

| Curing agent | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Amicure PACM | 100 | 97.75 | 97.75 | 99.5 | 97.5 | 97.5 | 99 | 99 | 95 | 95 | 90 | 98 | 98 | 97 |
| Dicy |  | 0.25 | 0.25 | 0.5 | 0.5 | 0.5 | 1 | 1 | 1 | 1 | 1 | 2 | 2 | 3 |
| Ancamine 1922A |  | 2 |  |  | 2 | 2 |  |  | 4 | 4 |  |  |  |  |
| DETA |  |  | 2 |  |  |  |  |  |  |  | 9 |  |  |  |
| amine/epoxy stochiometry | 1.0 | 0.81 | 0.84 | 0.82 | 1.0 | 0.82 | 0.82 | 0.72 | 1.0 | 0.82 | 0.82 | 0.91 | 0.82 | 0.91 |
| T onset (° C.) | 79.1 | ND | ND | 73.0 | 72.7 | 73.8 | 68.7 | 69.1 | 71.3 | 69.7 | 71.1 | 66.8 | 67.3 | 62.0 |
| T peak (° C.) | 113.9 | ND | ND | 109.8 | 109.4 | 111.3 | 106.8 | 108.2 | 108.3 | 108.3 | 108.8 | 105.0 | 105.1 | 101.5 |
| Tg (° C.) | 157.6 | 110.7 | 125.8 | 113.4 | 142.8 | 118.1 | 116.4 | 102.4 | 131.6 | 118.7 | 115.4 | 143.6 | 123.7 | 136.6 |
| Time to 10 Pa·s (sec) 85° C. | 515 | 536 | 476 | 497 | 434 | 503 | 459 | 519 | 405 | 456 | 455 | 338 | 392 | 302 |

ND: not determined

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A liquid curing agent composition comprising:
    at least 50% by weight of at least one polyamine; and
    0.2% to 10% by weight of dicyandiamide, wherein:
    the polyamine comprises a mixture of at least one major polyamine and at least one minor polyamine;
    the at least one major polyamine is at least 80% by weight of the total polyamine;
    the at least one minor polyamine is less than 20% by weight of the total polyamine;
    the at least one major polyamine comprises at least one of polyamides and amidoamines;
    the at least one minor polyamine comprises at least one member selected from the group consisting of aliphatic polyamines, polyetheramines, and cycloaliphatic polyamines;
    the ratio of the at least one minor polyamine to the dicyandiamide is sufficiently high so as to solubilize the dicyandiamide to an optically clear fluid;
    the ratio of the at least one minor polyamine to the at least one major polyamine is sufficiently low so as not to adversely affect the curing properties of the liquid curing agent relative to the at least one major polyamine; and
    the composition is effective to cure an epoxy component comprising at least one multi-functional epoxy resin when the ratio of the equivalent of the reactive amine hydrogen in the liquid curing agent composition to the equivalent of epoxide present in the epoxy component is 0.7 to 1.3.

2. The liquid curing agent composition of claim 1 comprising 0.2% to 5% by weight of dicyandiamide.

3. The liquid curing agent composition of claim 1 wherein the amidoamine comprises the reaction product of tall oil fatty acid and tetraethylenepentamine, and the polyamide comprises the reaction product of tall oil fatty acid, at least one dimer acid, and tetraethylenepentamine.

4. The liquid curing agent composition of claim 1 wherein the at least one minor polyamine comprises at least one member selected from the group consisting of diethylenetriamine (DETA), triethylenetetramine (TETA), N-3-aminopropyl ethylenediamine (N3), N,N'-bis(3-aminopropyl) ethylenediamine (N4), N,N,N'-tris(3-aminopropyl) ethylenediamine (N5), and 3,3,5-trimethyl-1,6-hexanediamine; 1,2-diaminocyclohexane, 4,4'-di(aminocyclohexyl) methane, isophorone diamine (IPDA), norbornane diamines, 1, 3-bis(aminomethyl)cyclohexane, and 1-cyclohexylamino-3-aminopropane; m-xylylenediamine (mXDA), p-xylylenediamine, di(aminoethyl)benzene, tri(aminoethyl) benzene, triethylene glycol diamine, poly(ethylene glycol-block-propylene glycol) bis(2-amino-2-methyl) ether, tri(2-amino-2-methylethyl) trimethylolpropane ether, bis(3- aminopropyl) polypropylene glycol ether, bis(3-aminopropyl) diethyleneglycol ether, bis(2-amino-2-methylethyl) diethylene glycol ether, poly(ethylene oxide) methyl (3-aminopropyl) ether, bis(3-aminopropyl)polytetrahydrofuran; heterocyclic polyamines of N-aminoethylpiperazine (NAEP), piperazine, 4,4'-trimethylenedipiperidine, 1,4-bis(3-aminopropyl)piperazine, 2, 5-dimethylpiperazine, and 2,6-dimethylpiperazine; amidoamines of reaction product of tall oil fatty acid (TOFA) and tetraethylene pentamine (TEPA), epoxy modified amidoamine, polyamide of the reaction product of dimer acid, and tall oil fatty acid (TOFA) with tetraethylene pentamine (TEPA), and amine-epoxy adducts prepared by the reaction of an aliphatic amine, cycloaliphatic amine, heterocyclic, polyether amine, aromatic amine with an epoxy resin, or combination thereof.

5. The liquid curing agent composition of claim 1, wherein the at least one major polyamine is at least 90% by weight of the total polyamine, and the at least one minor polyamine is less than 10% by weight of the total polyamine.

6. The liquid curing agent composition of claim 1, wherein the at least one major polyamine comprises at least one member selected from the group consisting of diethylenetriamine (DETA), triethylenetetramine (TETA), 1,2-diaminocyclohexane, 4,4'-di(aminocyclohexyl)methane, isophorone diamine (IPDA), norbornane diamines, 1,3-bis(aminomethyl)cyclohexane, 1-cyclohexylamino-3-aminopropane, N-aminoethylpiperazine (NAEP), piperazine, 4,4'-trimethylenedipiperidine, and 1,4-bis(3-aminopropyl)piperazine, and the at least one minor polyamine comprises at least one member selected from the group consisting of diethylenetriamine (DETA), 1,2-diaminocyclohexane, bis(3-aminopropyl) diethylene glycol ether, bis(3-aminopropyl) ethylene glycol ether, bis(3-aminopropyl) polypropylene glycol ether, tri(1-amiono-1-methylethyl) trimethylolpropane ether, and triethylene glycol diamine.

7. The composition of claim 1, wherein the ratio of the equivalent of the reactive amine hydrogen in the liquid curing agent composition to the equivalent of epoxide present in the epoxy component is 0.7 to 1.0.

8. The composition of claim 1, wherein the composition is cured at a temperature from 5° C. to 150° C.

9. The composition of claim 1, further comprising a reinforcing fiber.

10. The composition of claim 9, wherein the reinforcing fiber comprises at least one member selected from the group consisting of woven or non-crimp fabrics, nonwoven webs or mats, fiber stands, staple fiber formed of continuous or discontinuous fiber and combinations thereof.

11. The composition of claim 9, wherein the reinforcing fiber comprises at least one member selected from the group consisting of fiberglass, carbon fiber, carbon nanotubes nano composite fibers, polyaramide fibers, poly(p-phenylene benzobisoxazole) fiber, ultrahigh molecular weight polyethylene fibers, high and low density polyethylene fibers, polypropylene fibers, nylon fibers, cellulose fibers, natural fibers, biodegradable fibers and combinations thereof.

12. The composition of claim 1, wherein the epoxy component comprises a member selected from the group consisting of glycidyl ethers of polyhydric phenols.

13. The composition of claim 1, wherein the epoxy component comprises a member selected from the group consisting of 2,2-bis-(4-hydroxyphenyl)-propane and bis-(4-hydroxyphenyl)-methane.

14. The resin composition of claim 1, wherein the epoxy component comprises a cycloaliphatic epoxide.

15. The liquid curing agent composition of claim 1 wherein the liquid curing agent is substantially free of aliphatic, cycloaliphatic, aromatic and heterocyclic polyamines.

16. The liquid curing agent composition of claim 1 wherein the at least one major polyamine comprises di(aminocyclohexyl)methane and the at least one minor polyamine comprises at least one polyether amine.

17. The liquid curing agent composition of claim 1 wherein the solubility of dicyandiamide is greater in the at least one minor polyamine than in the at least one major polyamine.

18. A liquid curing agent composition comprising:
at least 50% by weight of at least one polyamine;
0.2% to 10% by weight of dicyandiamide, and
a reinforcing fiber,
wherein:
the polyamine comprises a mixture of at least one major polyamine and at least one minor polyamine;
the at least one major polyamine is at least 80% by weight of the total polyamine;
the at least one minor polyamine is less than 20% by weight of the total polyamine;
the at least one major polyamine comprises at least one cycloaliphatic polyamine;
the ratio of the at least one minor polyamine to the dicyandiamide is sufficiently high so as to solubilize the dicyandiamide to an optically clear fluid; and
the ratio of the at least one minor polyamine to the at least one major polyamine is sufficiently low so as not to adversely affect the curing properties of the liquid curing agent relative to the at least one major polyamine.

19. A liquid curing agent composition comprising:
at least 50% by weight of at least one polyamine;
0.2% to 10% by weight of dicyandiamide, and
a reinforcing fiber,
wherein:
the polyamine comprises a mixture of at least one major polyamine and at least one minor polyamine;
the at least one major polyamine is at least 80% by weight of the total polyamine;
the at least one minor polyamine is less than 20% by weight of the total polyamine;
the at least one major polyamine comprises at least one of polyamides and amidoamines;
the at least one minor polyamine comprises at least one member selected from the group consisting of aliphatic polyamines, polyetheramines, and cycloaliphatic polyamines;
the ratio of the at least one minor polyamine to the dicyandiamide is sufficiently high so as to solubilize the dicyandiamide to an optically clear fluid; and
the ratio of the at least one minor polyamine to the at least one major polyamine is sufficiently low so as not to adversely affect the curing properties of the liquid curing agent relative to the at least one major polyamine.

20. The liquid curing agent composition of claim 1 wherein the composition is effective to cure an epoxy component comprising at least one multi-functional epoxy resin when the ratio of the equivalent of the reactive amine hydrogen in the liquid curing agent composition to the equivalent of epoxide present in the epoxy component is 0.7 to 1.3.

* * * * *